US011816602B2

(12) United States Patent
Shoen et al.

(10) Patent No.: US 11,816,602 B2
(45) Date of Patent: Nov. 14, 2023

(54) METHOD AND APPARATUS FOR ONLINE RENTAL OF VEHICLES

(71) Applicant: U-Haul International, Inc., Phoenix, AZ (US)

(72) Inventors: Edward J Shoen, Phoenix, AZ (US); Michael George Colman, Glendale, AZ (US); Mariah Anne Reid, Phoenix, AZ (US); Arthur Scott Tonan, Phoenix, AZ (US); John Samuel Wathen, Phoenix, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 1258 days.

(21) Appl. No.: 15/473,429

(22) Filed: Mar. 29, 2017

(65) Prior Publication Data

US 2017/0206475 A1 Jul. 20, 2017

Related U.S. Application Data

(63) Continuation-in-part of application No. 14/341,610, filed on Jul. 25, 2014.
(Continued)

(51) Int. Cl.
*G06Q 10/02* (2012.01)
*G06Q 30/0645* (2023.01)

(52) U.S. Cl.
CPC ......... *G06Q 10/02* (2013.01); *G06Q 30/0645* (2013.01)

(58) Field of Classification Search
CPC ......... G06Q 10/02; G06Q 30/06; G07C 5/008
(Continued)

(56) References Cited

U.S. PATENT DOCUMENTS 7,991,388 B1 8/2011 Becker et al.
8,577,810 B1 11/2013 Dalit et al.
(Continued)

FOREIGN PATENT DOCUMENTS

WO WO-2013137181 A1 * 9/2013 ............. G06Q 10/02
WO WO2014152916 9/2014

OTHER PUBLICATIONS

Amy Hercher, "Technology Redefines Vehicle Damage Tracking", Jul. 23, 2015, autorentalnews.com, 9 pages (Year: 2015).*
(Continued)

*Primary Examiner* — Shannon S Campbell
*Assistant Examiner* — Freda A Nelson
(74) *Attorney, Agent, or Firm* — Richard E. Oney; Venjuris, P.C.

(57) ABSTRACT

A method and system for the online vehicle rentals, such as a car share rental, allows for a customer to self-dispatch and self-return a rental vehicle without requiring special equipment in the rental vehicle or the presence of rental personnel at the dispatch or return location. At the beginning of the rental period, the customer is prompted to input to a rental management computer system, via a mobile computer device, information about the mileage and fuel level of the rental vehicle and to report existing damage to the rental vehicle. If the customer wishes to extend the rental time period, the customer is prompted to select a requested extended end time for the rental time period and to send the requested extended end time to the rental management computer system. The rental management computer system automatically determines whether the requested extended end time conflicts with a future reservation for the vehicle, and if the requested extended end time does not conflict with a fixture reservation, the system extends the rental time period to the requested extended end time.

12 Claims, 43 Drawing Sheets

Related U.S. Application Data

(60) Provisional application No. 61/859,151, filed on Jul. 26, 2013.

(58) Field of Classification Search
USPC .............. 705/5, 307, 13, 28, 418; 340/5.72; 348/36; 701/31.5
See application file for complete search history.

(56) References Cited

U.S. PATENT DOCUMENTS

| | | |
|---|---|---|
| 9,240,990 B1 | 1/2016 | Ruma |
| 9,292,982 B1 | 3/2016 | Higgs et al. |
| 10,579,780 B1 | 3/2020 | Carlos et al. |
| 2002/0186144 A1* | 12/2002 | Meunier .............. G07B 15/00 340/4.6 |
| 2008/0067242 A1 | 3/2008 | Bonalle et al. |
| 2009/0321517 A1 | 12/2009 | Deane et al. |
| 2010/0106608 A1 | 4/2010 | Menendez et al. |
| 2010/0280700 A1* | 11/2010 | Morgal ................ G06Q 10/02 701/31.4 |
| 2011/0040692 A1* | 2/2011 | Ahroon ................ G06Q 50/163 705/307 |
| 2011/0058048 A1* | 3/2011 | Elazar ................ H04N 1/32101 348/207.1 |
| 2011/0112969 A1 | 5/2011 | Zaid et al. |
| 2011/0173041 A1 | 7/2011 | Breitenbach et al. |
| 2011/0276484 A1 | 11/2011 | Pearson et al. |
| 2011/0288891 A1 | 11/2011 | Zaid et al. |
| 2011/0307375 A1 | 12/2011 | Maney |
| 2011/0313937 A1 | 12/2011 | Moore, Jr. et al. |
| 2012/0070029 A1 | 3/2012 | Muriello et al. |
| 2012/0105197 A1* | 5/2012 | Kobres ................ G06Q 30/06 340/5.2 |
| 2012/0114196 A1 | 5/2012 | Lee |
| 2012/0200390 A1 | 8/2012 | Saravanan |
| 2012/0323930 A1 | 12/2012 | Kennberg et al. |
| 2013/0011820 A1 | 1/2013 | Yancosek |
| 2013/0073349 A1 | 3/2013 | Kolling |
| 2013/0221101 A1 | 8/2013 | Lebaschi et al. |
| 2013/0222616 A1 | 8/2013 | Mendis |
| 2013/0317693 A1* | 11/2013 | Jefferies ................ B60R 25/24 701/31.5 |
| 2013/0325521 A1* | 12/2013 | Jameel ................ G06Q 10/02 705/5 |
| 2015/0019300 A1 | 1/2015 | Vakili |
| 2016/0063616 A1* | 3/2016 | Bassett .............. G06Q 30/0645 705/13 |
| 2017/0039489 A1 | 2/2017 | Reh et al. |
| 2018/0204279 A1 | 7/2018 | Painter et al. |
| 2018/0211122 A1* | 7/2018 | Amico ................ B60K 37/00 |
| 2019/0095877 A1 | 3/2019 | Li |

OTHER PUBLICATIONS

Luo et al.; An Anonymous Car Rental System Based on NFC; 2013 International Symposium on Biometrics and Security Technologies; IEEE Computer Society; pp. 97-104.

* cited by examiner

FIG. 2B

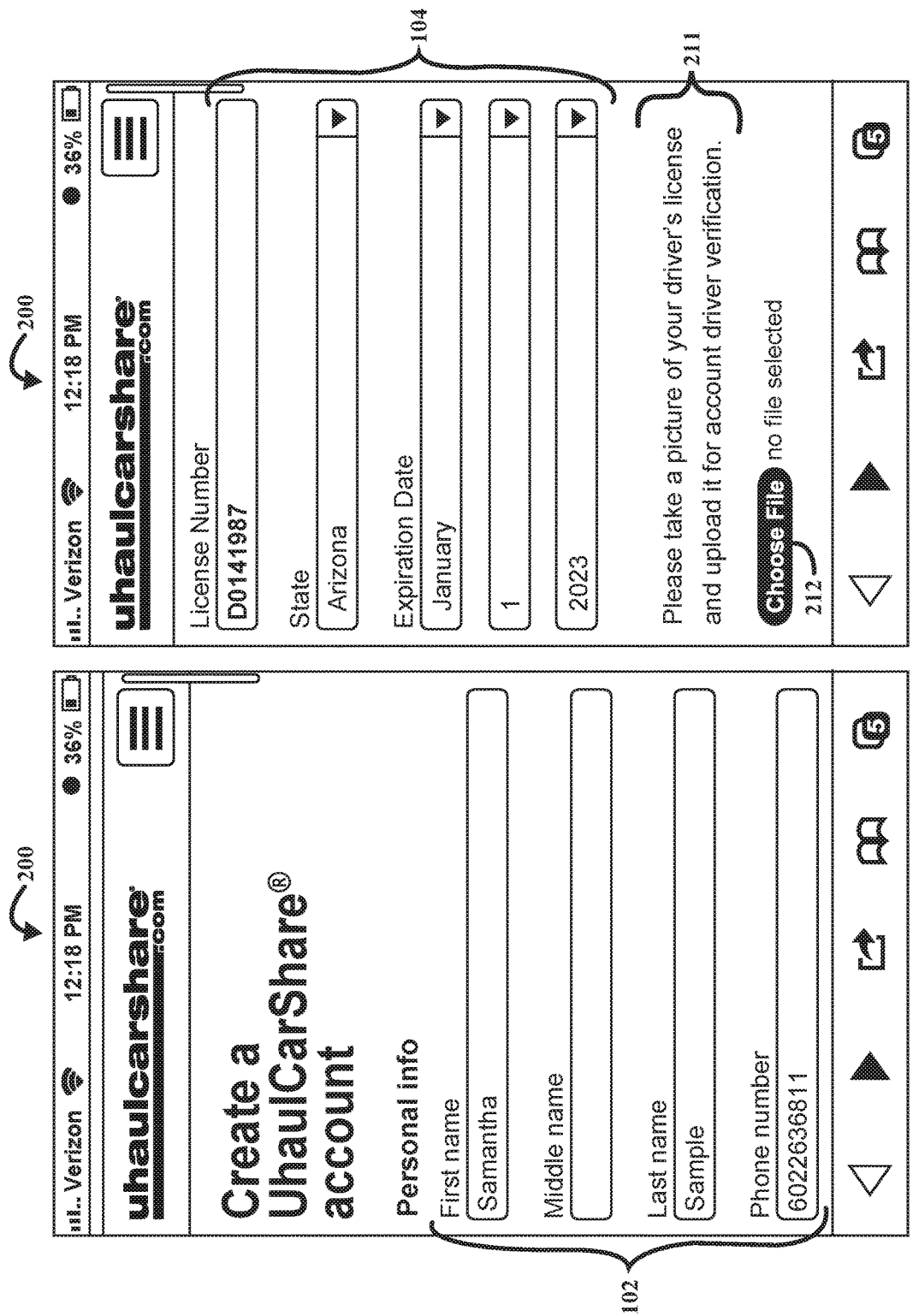

FIG. 9 uhaulcarshare.com
*Log In & Go*

430

Home | How it works | Work with us | Rewards | News
Reserve & Drive

2007 MINI Clubman
$4.95 an hour
plus $0.49/mile (No more than $10.00)

Vehicle Specs:
- ○ Fold down rear seats
- ○ MP3 Jack
- ○ Power Doorlocks
- ○ Power Windows
- ○ A/C
- ○ AM/FM
- ○ CD Player How long do you need the 2007 MINI Clubman?

07-31-2012
8am 9am 10am 11am 12pm 1pm 2pm 3pm 4pm 5pm 6pm — 432

To change your reservation, tap the first X to set your start time, then tap the second X to set your stop time.
$4.95 x 2 hours (Now to 10:30am) = $9.90
plus $0.49/mile Reserve now! — 434

Customer reviews
There are no reviews for this vehicle yet. Be the first!

877-990-UCAR   info@ucarshare.com   site map
© 2012 Uhaulcarshare. All rights reserved.

FIG. 10 uhaulcarshare.com
Log In & Go

450

Reserve & Drive

[Home] [How it works] [Work with us] [Rewards] [News]

454 — {
1. Driver's information

| First name: | Last name: | Date of birth: |
| --- | --- | --- |
| [          ] | [          ] | January ▼  1 ▼  1982 ▼ |

| Driver's license#: | State: | Expiration: |
| --- | --- | --- |
| [          ] | Alabama ▼ | January ▼  1 ▼  2017 ▼ |
}

460 — {
2. Billing information

| First name: | Last name: | Address: |
| --- | --- | --- |
| [          ] | [          ] | [          ] |

| ZIP/postal code: | Email address: |
| --- | --- |
| [          ] | [          ] |
}

458 — {
3. Credit card information

| Name on card: | Credit card#: | Experation date: | Security code: |
| --- | --- | --- | --- |
| [          ] | [          ] | 12 ▼  2014 ▼ | [    ] |
}

462 — {
4. Terms and conditions

☐ I agree to the Terms and Conditions.
☐ I will not drive under the influence of drugs or alcohol.
☐ I understand that I can have passengers in the car but I am the only one authorized to drive the car.
}

464 — [Submit]

877-990-UCAR  info@ucarshare.com  site map
© 2012 Uhaulcarshare. All rights reserved.

FIG. 11 uhaulcarshare.com
*Log in & Go*

480

Home | How it works | Work with us | Rewards | News
Reserve & Drive

*Please Confirm*

Vehicle:
2007 MINI Clubman

Where:
2727 N Central Ave

When:
Tue, July 31, 8:30AM to
Tue, July 31, 10:30AM

How much:
Estimated cost $14.85 plus $0.49/mile

Tax: $2.37

[ Nevermind ]                    [ I'll take it! ]

877-990-UCAR  info@ucarshare.com site map
© 2012 Uhaulcarshare. All rights reserved.

FIG.12

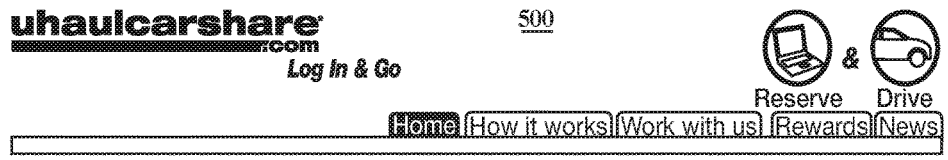

uhaulcarshare 500
Log In & Go

Reserve  Drive

Home | How it works | Work with us | Rewards | News

*Congrats, you're ready to roll!*
Your reservation is for 7/31/2012 at 8AM to 7/31/2012 at 10AM

Vehicle:
2007 MINI Clubman ()

Location:
2727 N Central Ave
Phoenix, AZ 85004

264 Keypad access code:
8675309

Gas refuel code:
286456

Reservation date:
Tue, July 31, 8:30AM to
Tue, July 31, 10:30AM

Estimated cost:
Rental amount:
$14.85

Price per mile:
$0.49/mile

Tax: $2.37

Total:
$14.85 + $0.49/mile be sure to return the car to the same spot you picked it up from or you will be charged a $50 late fee.

If you have any problems, feel free to contact us

877-990-UCAR  info@ucarshare.com  site map
© 2012 Uhaulcarshare. All rights reserved.

600d uhaulcarshare

Thanks for Driving with us!

Did you have any electrical problems?
○ Yes  ○ No

Did you have any braking problems?
○ Yes  ○ No

Did any of the dash indicator lights stay on?
○ Yes  ○ No

Did you have any engine overheating problems?
○ Yes  ○ No

Is there anything we should fix before the next customer rents this vehicle?
○ Yes  ○ No Done 636
638

1-877-990-****  |  About  |  FAQs  |  Member Handbook  |  Privacy policy  |  Contact

FIG. 32

Closing Details – (Unattended Receive)

Customer location details — 366

Vehicle home
location Latitude: 33.51311167394859
Longitude: -112.13318961943

Customer
location Latitude: 33.5116472
Longitude: -112.1341285

Distance 0.12 miles

Dashboard Photo — 356

No damage was reported.

Survey answers — 358

Odometer/Fuel Gauge details — 368

Odometer: 4176
Fuel Level: 3/4 Tank

| Question prompt | Given answer | Indicates a problem |
|---|---|---|
| Did you have any electrical problems? | No | False |
| Did you have any braking problems? | No | False |
| Did any of the dash indicator lights stay on? | No | False |
| Did you have any engine overheating problems? | No | False |
| Is there anything we should fix before the next customer rents this vehicle? | No | False |
| What needs to be fixed? | No | False |

METHOD AND APPARATUS FOR ONLINE RENTAL OF VEHICLES

RELATED APPLICATION

This patent application is a Continuation-in-Part patent application of and claims priority to U.S. patent application Ser. No. 14/341,610, filed on Jul. 25, 2014, and entitled "Method and Apparatus for Real-Time Qualification of Rental Customers," which is incorporated herein in its entirety by this reference and which claims the benefit of U.S. Provisional Application No. 61/859,151, filed Jul. 26, 2013, entitled "Method and Apparatus for Real-Time Qualification of Rental Customers," which is incorporated herein by reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention generally is directed to an online method and system for rental of vehicles. More particularly, it relates to a method and system that allows a rental company to quickly qualify a rental customer making an online reservation of a rental vehicle, such as a car share rental, without requiring the customer to be a member or have a membership or to be pre-qualified and provides for customer self-dispatch and self-return without requiring special equipment in the rental vehicle or onsite presence of rental personnel.

With present systems and methods for renting vehicles, such as a car share vehicle, the process for approving a rental customer for a rental transaction (i.e., qualifying the customer) takes longer than is desirable for both the rental company and the customer. It is an object of the present invention to provide a method and apparatus for quickly qualifying rental customers, including car share customers.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification and the appended claims.

SUMMARY

To achieve the foregoing objects, and in accordance with the purposes of the invention as embodied and broadly described in this document, there is provided a method and system for online rental of vehicles. The method and system allows a customer to self-dispatch and self-return a rental vehicle without requiring special equipment in the rental vehicle or onsite presence of rental personnel.

One exemplary method for online rental of vehicles according to the invention includes storing in a non-transitory computer database rental transaction information associated with a customer for reserving a rental vehicle for a rental time period, wherein the computer database is accessible by a rental management computer system. At or during the beginning of the rental time period, the rental management computer system prompts a customer to input via a mobile computer device information about the mileage and fuel level of the rental vehicle at the beginning of the rental period. The rental computer system also prompts the customer to use the mobile computer device to report existing damage to the rental vehicle and notifies the customer of a time limit for reporting the existing damage. If the customer elects to report any existing damage to the rental vehicle, the rental computer system prompts the customer to use the mobile computer device to capture information for confirming the existing damage and to send the information to the rental computer system. The customer is also prompted to use the mobile computer device to manually input mileage information and fuel level information for the rental vehicle, to capture image information for confirming the accuracy of the mileage information and fuel level information for the rental vehicle, and to send the image information to the rental computer system. The image information includes an image of the mileage and fuel level displays of the rental vehicle.

Some methods according to the invention include, during the rental time period, prompting the customer to select a requested extended end time for the rental time period and to send the requested extended end time to the rental management computer system. The rental management computer system then automatically determines whether the requested extended end time conflicts with a future reservation for the vehicle. If the requested extended end time does not conflict with a future reservation, the system can extend the rental time period to the requested extended end time. Automatically determining whether the requested extended end time conflicts with a future reservation for the vehicle can include setting a time interval to be maintained between consecutive reservations for the vehicle and determining that there is no conflict if the requested end time precedes the beginning of the future reservation for the vehicle by at least the time interval to be maintained between customer reservations for the vehicle.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

FIGS. 2A and 2B show an exemplary screen display of an account creation page of a website according to the present invention, which page allows a rental customer to provide information for establishing an account with the rental management computer system via the website.

FIGS. 4A-4D show an exemplary mobile version of an account creation page of the website displayed on the screen of a mobile computer device.

FIG. 9 shows an exemplary embodiment of a vehicle selection web page, with which a customer can select a car for rental from a car share.

FIG. 10 shows an exemplary embodiment of a reservation web page, from which the user can select a pick-up date and time period for the rental.

FIG. 11 shows an exemplary embodiment of a rental submission web page, which prompts the customer to enter the customer's driver's license information, billing address information, and payment method information.

FIG. 12 shows an exemplary embodiment of a confirmation web page, from which a customer can confirm their requested reservation.

FIG. 13 shows an exemplary embodiment of a verification web page, which verifies the completion of a customer's rental reservation.

FIG. 14 shows one embodiment of a web page describing some criteria that a customer must meet in order to rent a vehicle according to one exemplary rental qualification process in accordance with the present invention.

FIGS. 15A and 15B show one exemplary embodiment of an administrative approval web page that an administrator of the rental management computer system can use to review a rental customer's information and qualify the customer in accordance with the present invention

FIG. 32 shows an exemplary vehicle questionnaire web page displayed on the screen of a mobile computer device, which prompts the customer to answer questions regarding the condition of the rental vehicle being returned.

FIG. 34B shows an exemplary web page displayed on a computer screen for an administrator to view information submitted by a customer during the self-return process.

DESCRIPTION

Reference will now be made in more detail to presently preferred embodiments of the invention. While the invention is described more fully with reference to these examples, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

According to the present invention, a rental management computer system is used to manage and provide rental services, such as car sharing rentals, to customers. A rental customer can use a mobile computer device, such as a smart phone, to communicate with the rental management computer system to provide information that can be used to quickly qualify the customer for a rental transaction, including an image of the customer's driver's license and an image of the customer. According to one feature, the customer can use a mobile computer device to self-dispatch and self-return the rented vehicle without requiring the physical presence of rental personnel at the dispatch and return sites. In a preferred embodiment of the invention, this communication takes place via the mobile device through the Internet. Although the present invention is described with respect to car sharing rentals, it will be understood that it also can be used with rentals of other types of equipment or vehicles, including trucks for self-moving.

Computer Network System

Figure 1:
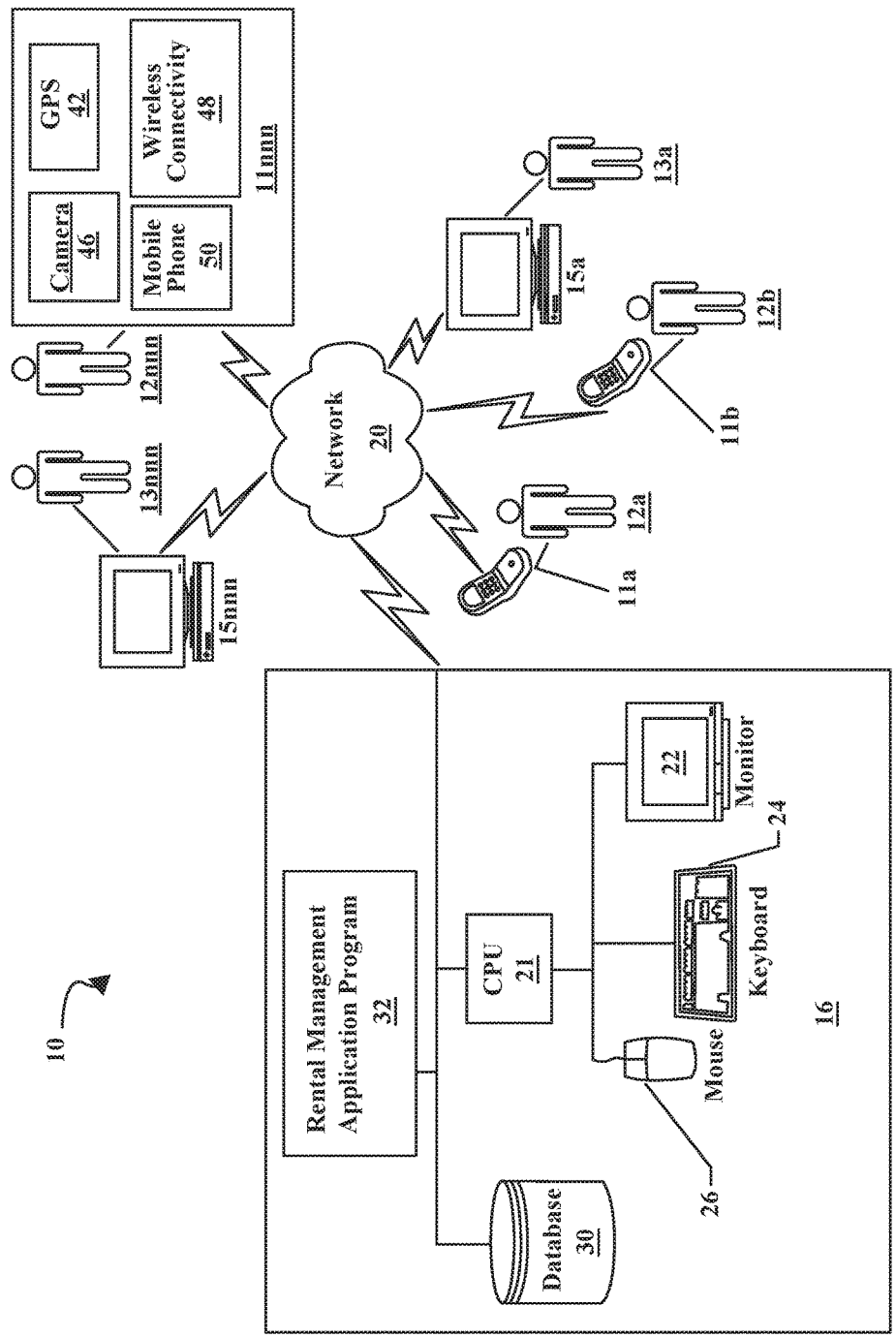
FIG. 1 is a functional block diagram of a preferred computer system and a network for practicing the present invention, including a rental management computer system (which can be used to host a website), and mobile computer devices.

FIG. 1 illustrates a preferred computer network system 10 for practicing the present invention. The computer network system 10 includes a rental management computer system 16, which hosts a website and stores and processes the information described below for creating an account for a customer, quickly qualifying the customer for a rental transaction, processing the transaction and confirming the transaction to the customer. Customers 12 can access and communicate with the rental management computer system 16 via mobile computer devices 11a, 11b and 11nnn, (where nnn refers to any number of users and user devices) coupled to the rental management computer system 16 via a computer network 20, such as the Internet, or by other suitable communications means. In addition, in a presently preferred embodiment, rental customers 13a-13nnn can use computers 15a-15nnn coupled to the computer system 16 via the computer network 20. In a preferred embodiment of the invention, the computer network 20 comprises the Internet and the mobile computer devices 11 and computers 15 each have a web browser application for accessing content on the World Wide Web. The mobile computer device 11 can be, by way of example, a smart phone or similar device. In a preferred embodiment, the mobile computer device 11 includes a web browser, a global positioning system (GPS) program 42, a digital camera 46, wireless connectivity 48 and a mobile telephone 50. Upon reading this specification, those skilled in the art will understand that, under appropriate circumstances, considering issues such as developments in computer hardware, software and connectivity, etc., other network configurations and devices also may suffice. For example, the mobile computer device 11 can be any mobile device suitable for communication over the Internet, including without limitation, smartphone, PDA, handheld mobile digital electronic device, tablet computer, portable computer or the like.

Still referring to FIG. 1, the rental management computer system 16 includes a central processing unit (CPU) 21 for processing data and program instructions. The rental management computer system 16 also includes input and output devices, as is well known in the art. For example, the rental management computer system 16 preferably includes a display screen or monitor 22, a keyboard 24, a mouse 26, a printer (not shown), etc. The rental management computer system 16 further includes data storage and memory devices, as are known in the art, for storing a database 30. The database 30 is used to store customer data and other rental data required to provide the functionality described below. Preferably, the database 30 is a relational database, as is well known in the art. A rental management application program 32 is operable with the database 30 and the mobile computer device 11 to provide the functionality described below. In a presently preferred embodiment, the rental management application program 32 is written using the ASP.NET MVC framework utilizing the Model-View-Controller (MVC) architectural pattern, marketed by Microsoft Corporation of Redmond, Wash. The database 30 is implemented using the SQL Server database management system, also marketed by Microsoft Corporation. Upon reading this specification, those skilled in the art will understand that, under appropriate circumstances, considering issues such as developments in computer hardware, software and connectivity, etc., other operating systems, programming languages and database management systems can be used.

Customer Interface

FIGS. 2-3 and 9-14 show exemplary web pages served by the rental management computer system 16 to a customer computer 15, through which the customer can create an account and reserve a vehicle.

Figure 2A:
Figure 2B:
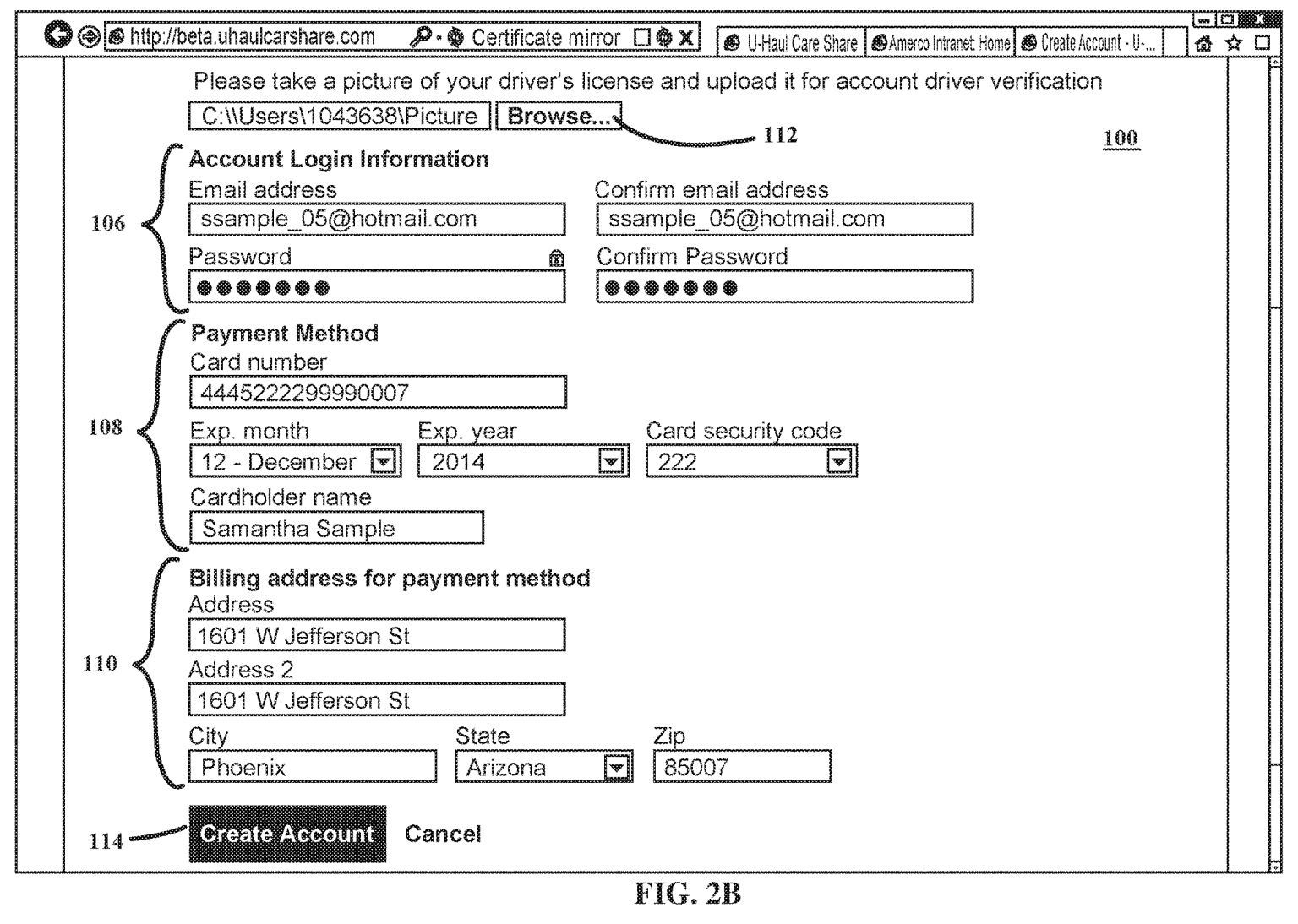

As shown in FIG. 2, an account creation page 100 includes personal information fields 102 (e.g., for a customer to enter his or her name, telephone number and date of birth), driver's license information fields 104 (for entering the customer's driver's license information), account login information fields 106, payment method information fields 108 and billing address information fields 110. The account creation page 100 prompts a user to enter the information into these fields to create an account. The account creation page 100 includes an instruction 111 to take a picture of the customer's driver's license for uploading to the system 16. A browse button 112 allows the customer to browse his or her image files (e.g., the image files stored locally on the customer computer 15) for the driver's license photo. After providing the information prompted by the account creation page 100, the customer can create an account by selecting a Create Account button 114, which causes the entered information, including the customer's driver's license photo, to be uploaded to the system 16.

Figure 9:
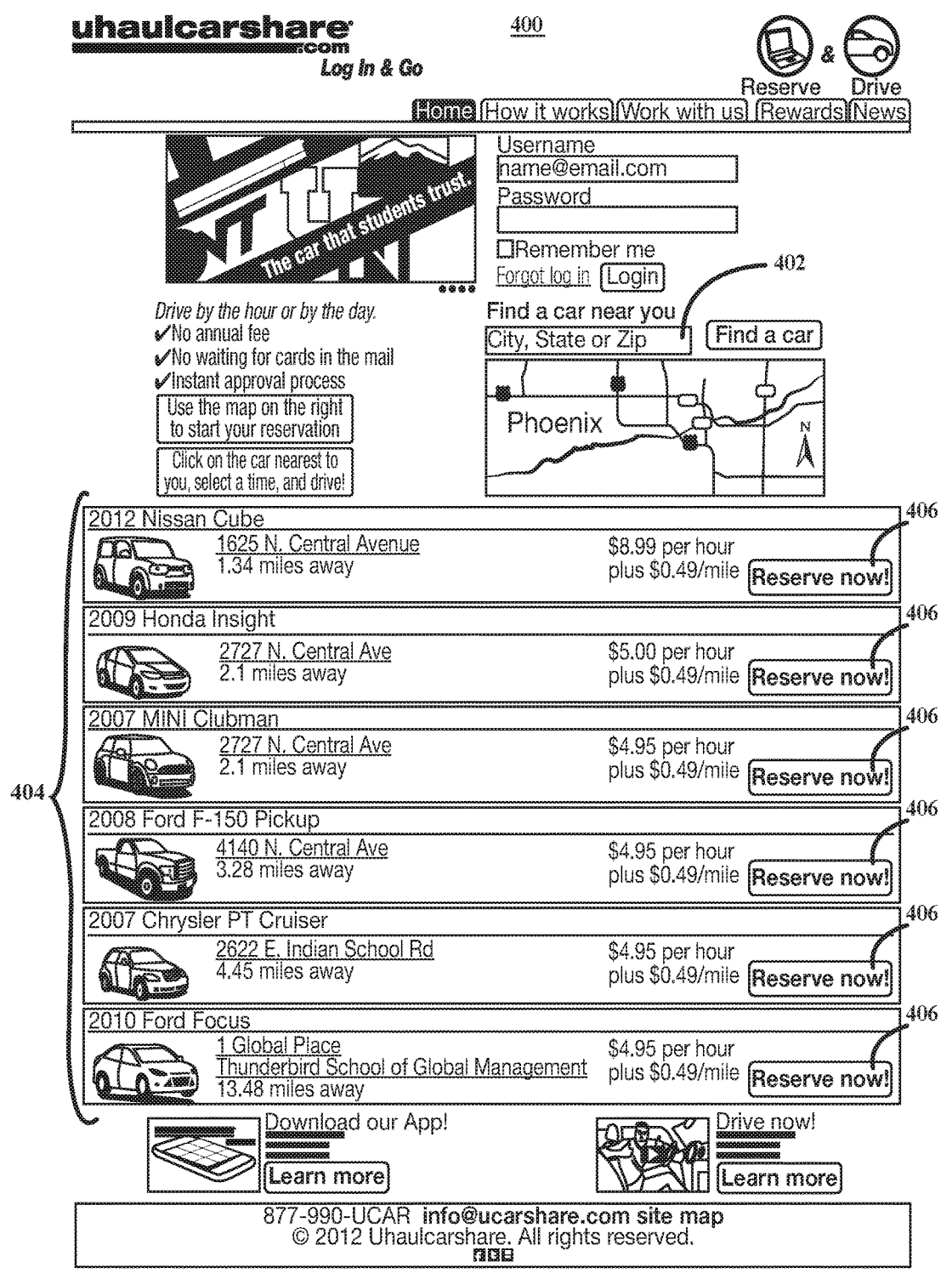

After a customer's account is created, the customer can select a vehicle to reserve for rental. FIG. 9 shows one exemplary embodiment of a vehicle selection page 400 with which a customer can select a car for rental from a car share. It will be understood that the vehicle selection page 400 also can be displayed so that a potential customer can view vehicle information and select a vehicle of interest before he or she creates an account. Using the vehicle selection page 400, the user can find the closest vehicle using GPS or can search by city/state or zip code by entering that location information into a search field 402, which causes the system 16 to display vehicle availability information 404. The user can then select the vehicle that he or she wants to reserve by clicking on the appropriate Reserve Now button 406. In response, the system 16 displays a reservation page 430, as shown in FIG. 10, from which the user can select a pick-up date and time period for the rental. In the embodiment of FIG. 10, the user can select the rental time period by using a rental timeline input section 432. It will be understood, however, that the inputs for the rental date and time period can be provided via other forms of input fields, such as via drop-down lists, a date and time picker, or the like. After the user enters a rental date and time period and clicks on the Reserve Now button 434, the requested rental information is uploaded to the rental management computer system 16.

In some embodiments, the system 16 will display rental submission page 450, as shown in FIG. 11, which prompt the customer to enter information in driver's license information fields 454 (for entering the customer's drivers license information), payment method information fields 458 and billing address information fields 460. If the customer already has an account, the system 16 can pre-populate these fields with information previously provided by the customer and stored in the database 30. In addition, as shown in FIG. 11, the system 16 requires the customer to agree to certain terms and conditions of the rental 462. The customer can then submit the rental request by clicking on the Submit button 464, and the system 16 will display a confirmation page 480 as shown in FIG. 12, from which the customer can confirm the rental request.

Figure 3:
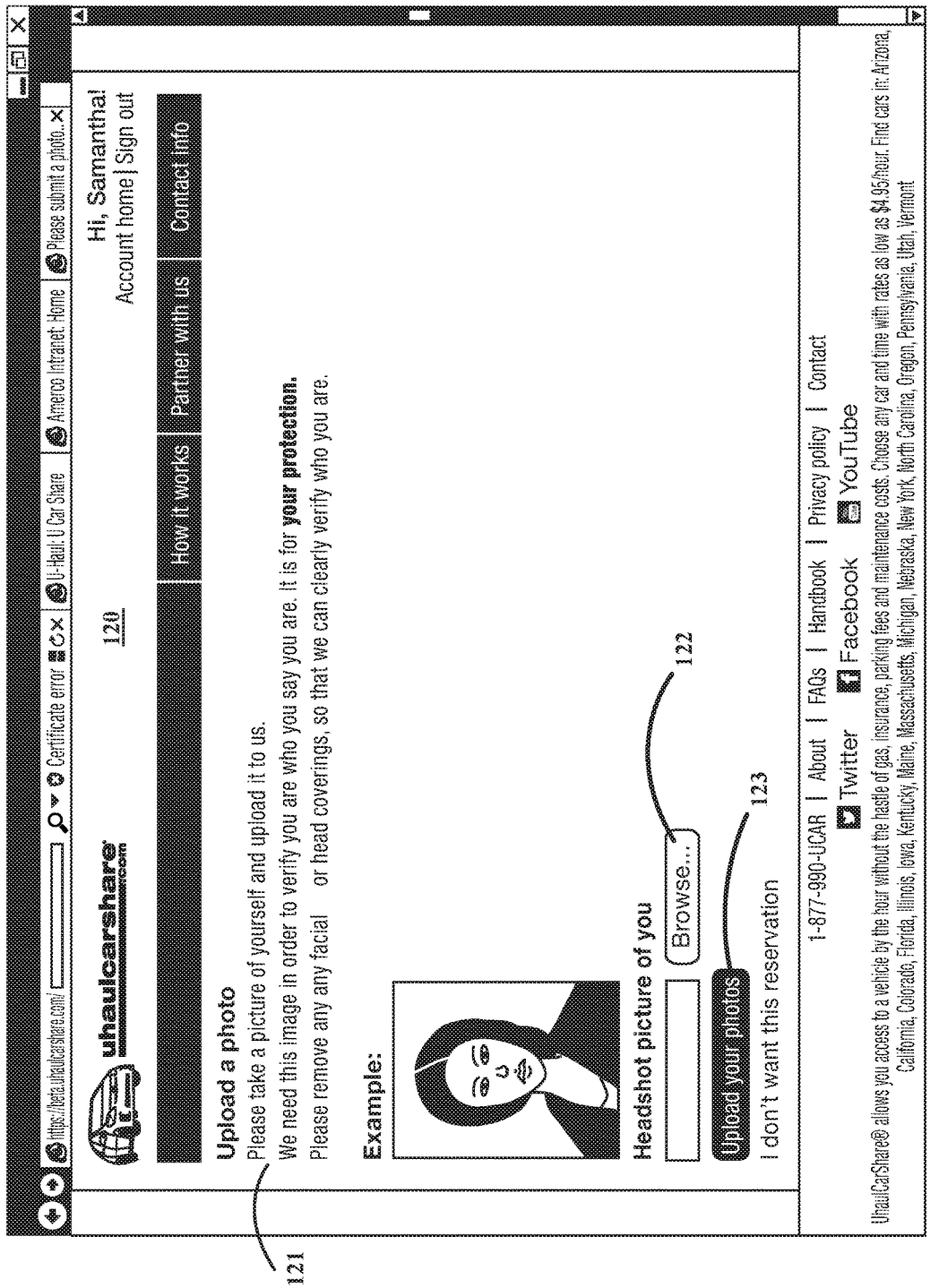
FIG. 3 shows an exemplary screen display of a photo upload page of the website, which a customer can use to upload an image for use in the rental qualification process according to the invention.

Referring back to FIG. 3, as part of the rental qualification process, the system 16 requires a user to upload a photo or video of the customer to compare against the customer's driver's license photo that previously has been uploaded to the system 16 and stored in the database 30. FIG. 3 shows an exemplary screen display of a photo upload web page 120 served by the system 16, which can be used for this purpose. The photo upload page 120 includes an instruction 121 to the customer to take a picture of himself or herself and to upload that picture for comparison to the customer's stored driver's license photo. A browse button 122 allows the customer to browse the computer files to select the customer photo to be uploaded. Once the customer photo is selected, it can be uploaded to the system 16 by selecting an upload button 123.

Referring to FIG. 13, after a customer is qualified for a requested rental transaction, the rental management computer system 16 can cause the customer computer 15 to display a verification page 500 that verifies the customer's rental reservation. This verification can include a code for accessing the rental vehicle, such as a keypad access code 264 or a lockbox access code.

Mobile User Interface

In one presently preferred embodiment, the customer can create an account and communicate with the rental management computer system 16 using a mobile computer device. Referring to FIGS. 4-7, the functionality and operation of the mobile computer device 11 will now be illustrated in connection with a more detailed description of the user interface of that device.

Figure 4C:
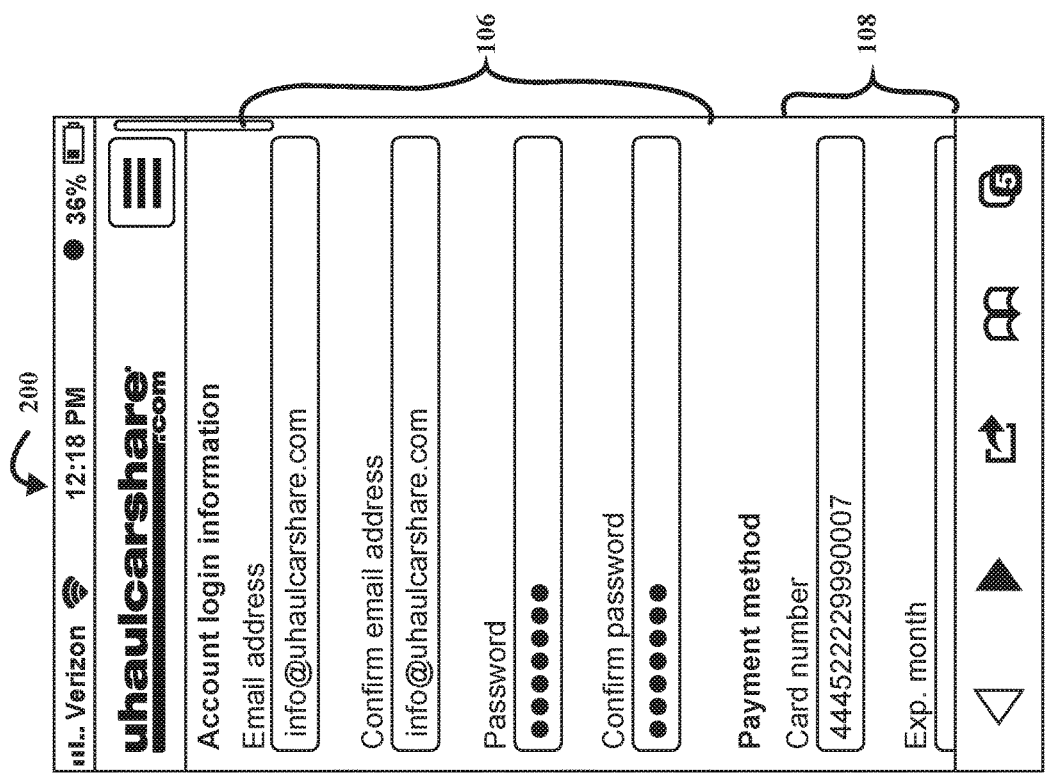

FIGS. 4A-4D show an exemplary mobile account creation page 200 served by the system 16 and displayed on the screen of the mobile computer device 11. Similar to the embodiment of the account creation page 100 described above, the mobile account creation page 200 prompts a user to enter the information into personal information fields 102 (see FIG. 4A), driver's license information fields 104 (see FIG. 4B), account login information fields 106 (see FIG. 4C), payment method information fields 108 (see FIG. 4C) and billing address information fields 110 (see FIG. 4D). As shown in FIG. 4B, the mobile account creation page 200 can include an instruction 211 to prompt a customer 12 to upload, as part of the driver's license information, an image of his or her driver's license (which can be taken with and stored on the mobile computer device 11). The user can designate the driver's license image file to be uploaded by selecting the Choose File button 212.

After providing the information prompted by the mobile account creation page 200, the customer can create an account by selecting a Create Account button 114 (see FIG. 4D), which causes the entered information, including the customer's driver's license photo, to be uploaded to the system 16 and stored in the database 30.

Figure 5A:
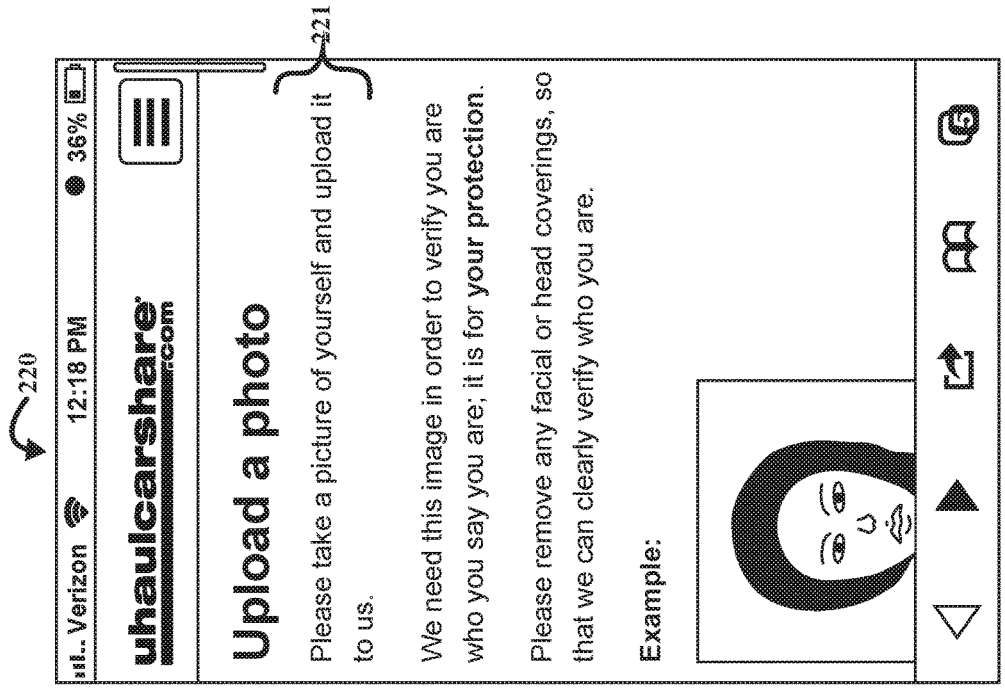
FIGS. 5A-5C show an exemplary mobile version of a photo upload page of the website, which a customer can use to upload a photo or video for use in the rental qualification process.
Figure 4D:
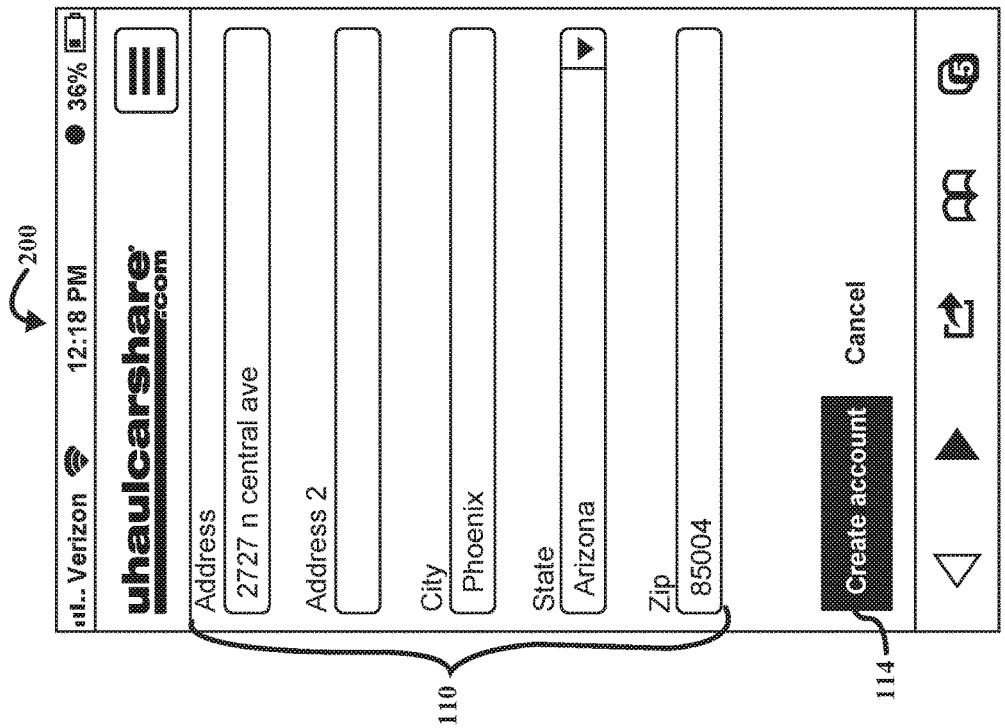
Figure 5C:
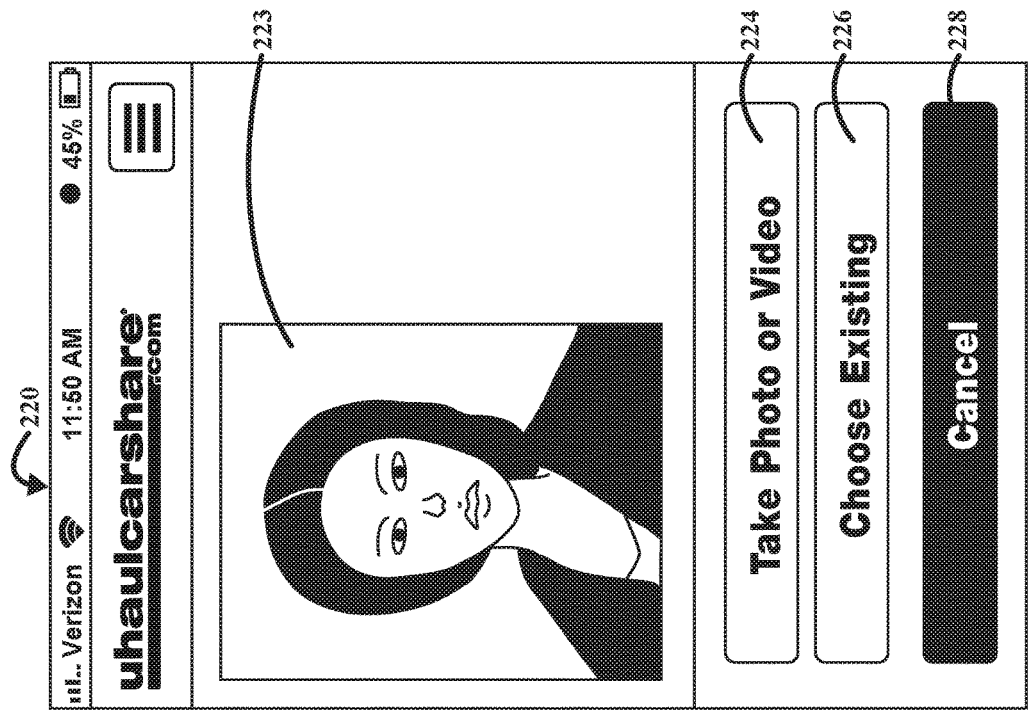
Figure 5B:
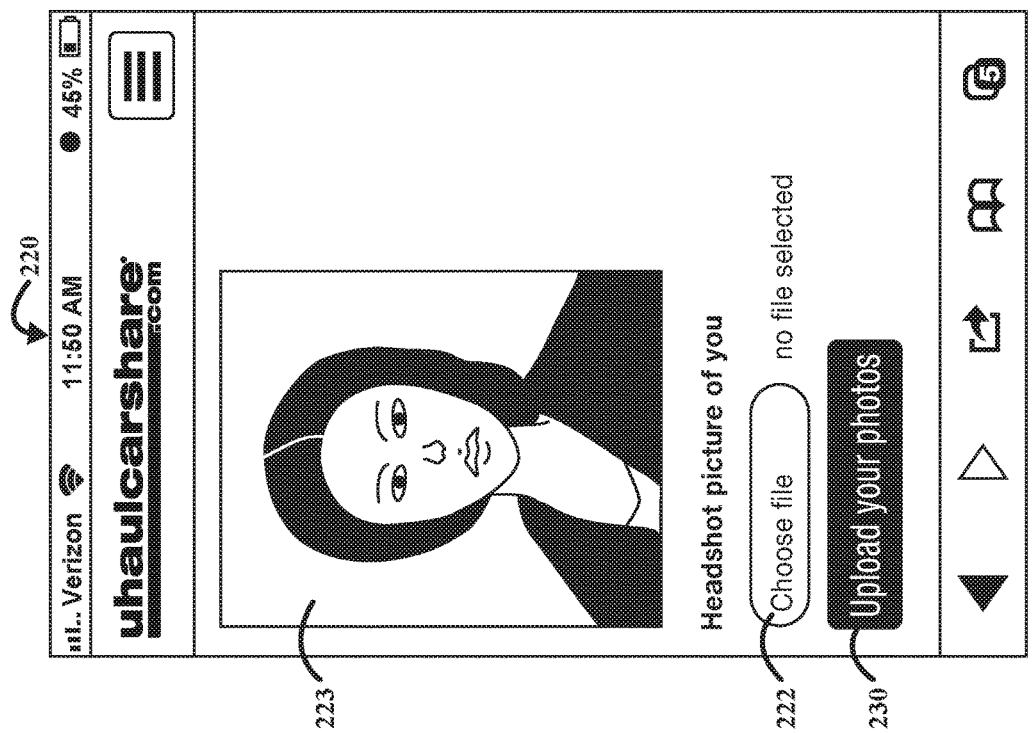

As previously described, as part of the rental qualification process, the system 16 requires a user to upload a photo or video of a rental customer to compare against a customer's driver's license photo previously uploaded to the system 16 and stored in the database 30. FIGS. 5A-5C show an exemplary mobile photo upload page 220 displayed on the screen of the mobile computer device 11, which page can be used for this purpose. The mobile photo upload page 220 includes an instruction 221 to the customer to take a photo or video of himself or herself and to upload it for comparison to the customer's stored driver's license photo (see FIG. 5A). Preferably, the customer can use the camera 46 of their mobile computer device 11 to take such a photo or video. As shown in FIG. 5B, the mobile photo upload page 220 can include a Choose File button 222. When the customer selects the Choose File button 222, the system 16 causes the mobile photo upload page 220 to display a Take Photo or Video button 224 and a Choose Existing button 226, as shown in FIG. 5C. By selecting the Choose Existing button 226, the customer can browse computer files (e.g., the video and image files stored locally on the mobile computer device 11) for the customer photo or video to be uploaded.

If the customer chooses the Take Photo or Video button 226, the mobile computer device 11 can enable the camera 46 so that the customer can take a photo or video of himself or herself for uploading. After a photo or video has been chosen for uploading, the mobile computer device 11 will display the chosen image 223 as well as an Upload Your Photos button 230, as shown in FIG. 5B. When the user selects the Upload Your Photos button 230, the mobile computer device 11 uploads the chosen photo or video file to the system 16, which stores the chosen photo or video file for comparison with the uploaded image of the customer's driver's license photo.

In a preferred embodiment, to assure that the customer photo or video is current, it must be taken and uploaded within a pre-defined time before the reservation becomes active and the rental period begins. In one exemplary embodiment, the photo or video must be taken and uploaded one hour or less before the selected reservation time period begins. Timestamp information associated with the photo or video file can be used by the system 16 to assure that the uploaded file is sufficiently current. Similarly, other information associated with the uploaded file, such as the GPS location associated with the file, can be used to qualify the customer.

Figure 6A:
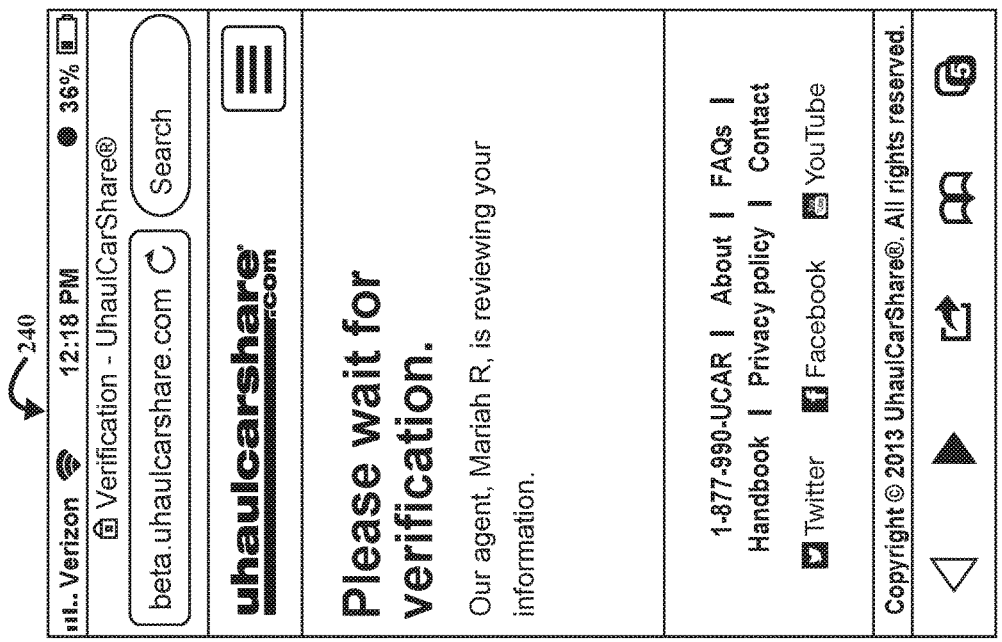
FIGS. 6A and 6B show an exemplary mobile version of a verification web page displayed on the screen of the mobile computer device, showing the status of the review of the customer's information for qualifying the customer in accordance with the present invention.
Figure 6B:
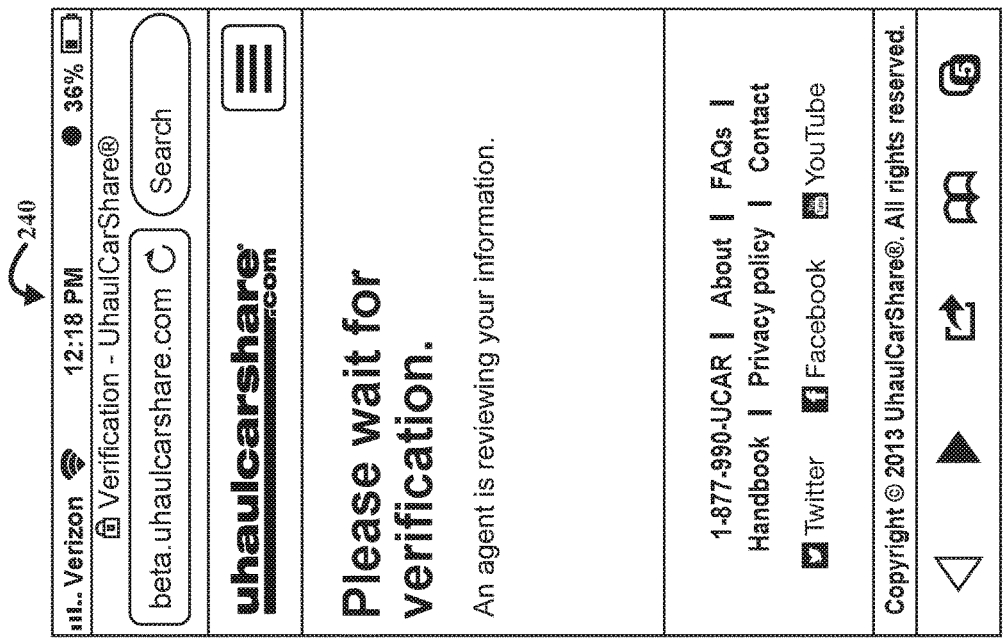

Referring to FIGS. 6A and 6B, after the customer's photo is uploaded, the rental management computer system 16 serves the mobile device 11 a mobile verification page 240, which shows the status of the customer qualification process. For example, as shown in FIGS. 6A and 6B, the mobile verification page 240 can display a message indicating that a reviewing agent is reviewing the information relating to the requested rental. This process can involve a review of various qualifying factors, including for example:

Whether the customer has previously rented a vehicle using the rental management computer system 16;
    Whether the customer has previously purchased any other good or service from the entity that is operating the rental management computer system 16;
    The time of the rental;

The location of the rental;

A comparison of the customer's uploaded photo or video with the image of the customer's driver's license;

Comparison of the meta data associated with the customer's uploaded photo or video to the location and timing of the rental;

A comparison of the customer's uploaded photo or video with previously uploaded photos or videos;

A comparison of the location of the rental with the geographic information on the customer's driver's license, such as the state of issuance; and The results of a dexterity test that can be performed by the customer using the mobile device.

If the reviewing agent needs additional information, such as a better photograph of the customer, the agent can communicate a request directly to the customer for the additional information via the customer's mobile device 11, such as via a pop-up box displayed on the mobile computer device 11 for sending a text message or email.

Figure 7B:
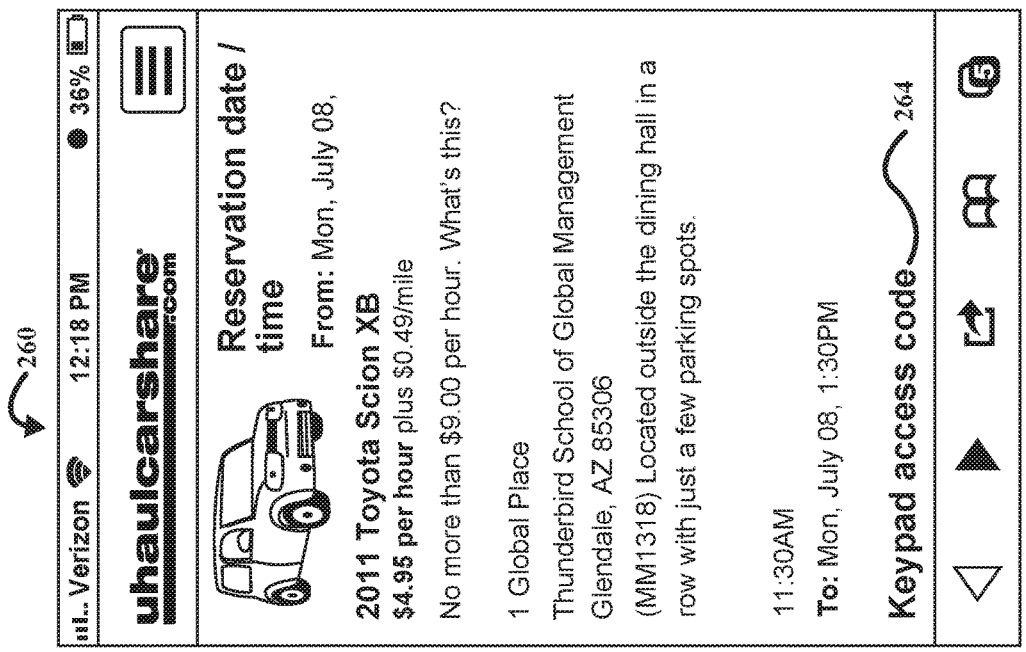
FIGS. 7A and 7B show an exemplary mobile version of a confirmation web page displayed on the screen of the mobile computer device, which depicts the confirmation of a customer's rental vehicle reservation after the customer has been qualified.
Figure 7A:
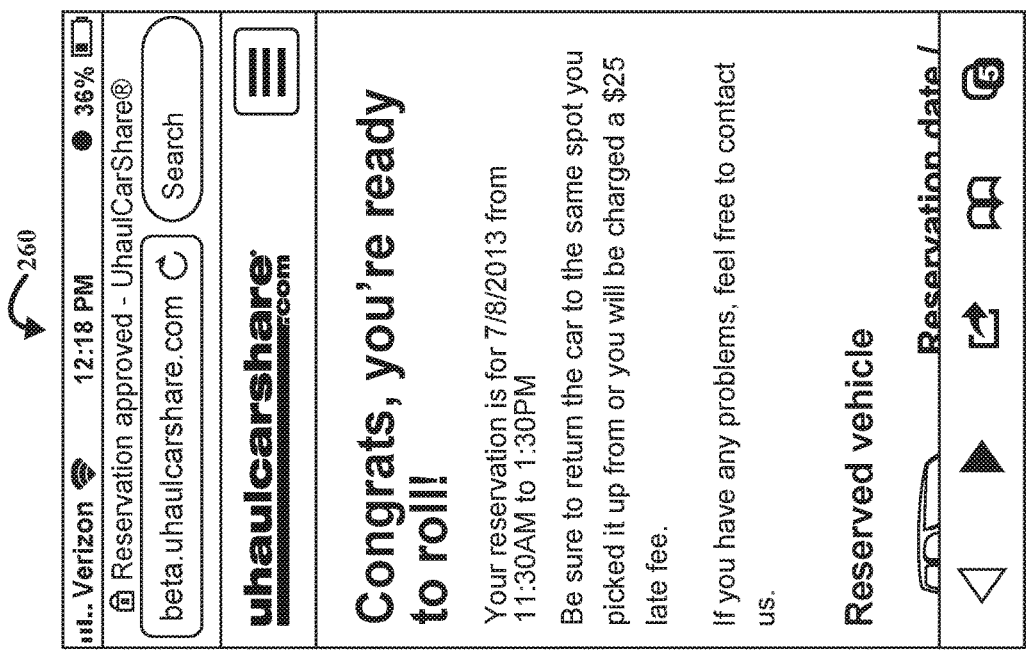

Referring to FIGS. 7A and 7B, after a customer is qualified for a requested rental transaction, the rental management computer system 16 can cause the mobile computer device 11 to display a mobile verification page 260 that verifies the customer's rental reservation. This verification can include a code for accessing the rental vehicle, such as a keypad access code 264.

Figure 8:
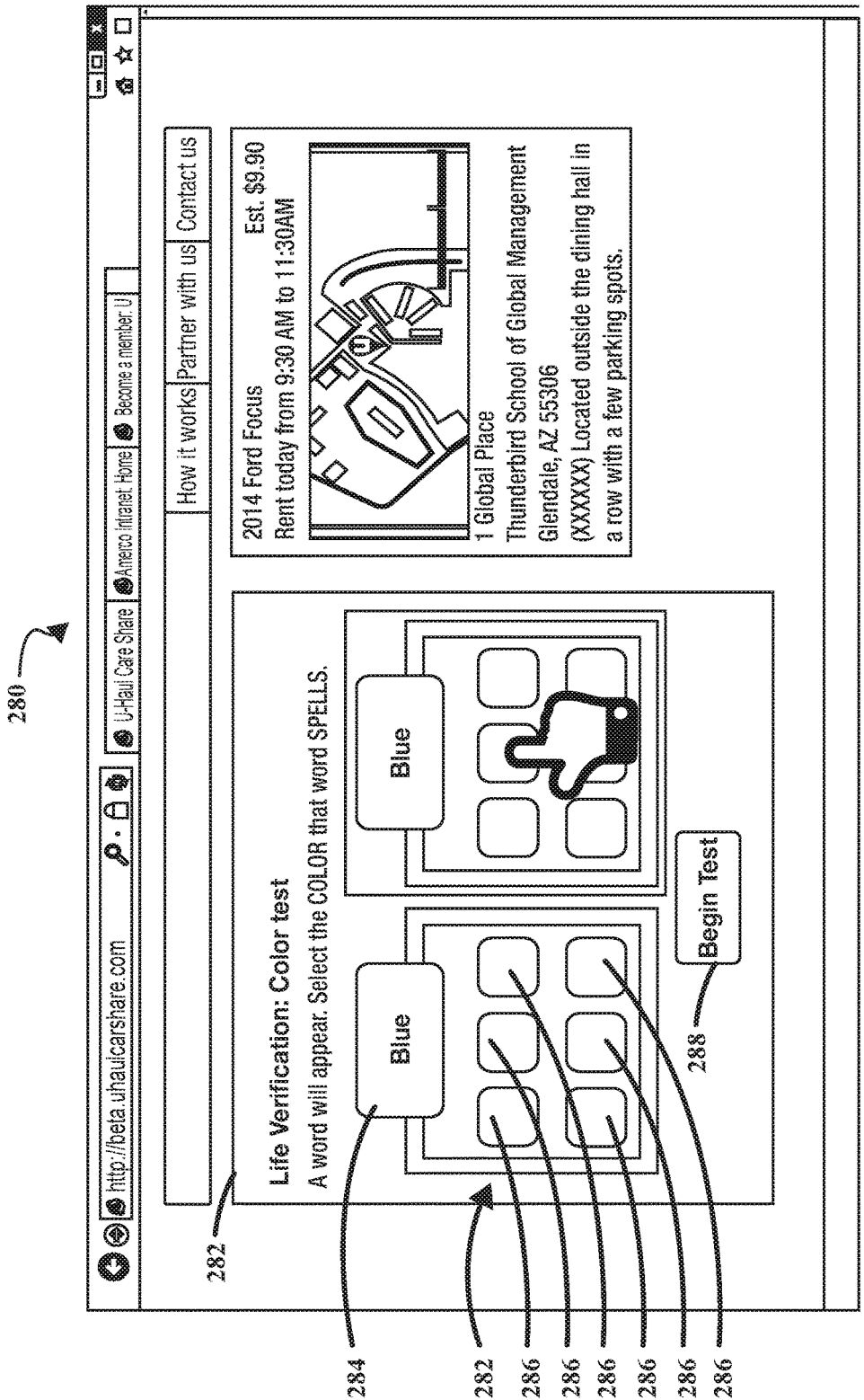
FIG. 8 shows an exemplary embodiment of a live verification test web page for presenting a dexterity test to a customer as part of a rental qualification process.

As mentioned above, one of the factors in qualifying a customer for a rental transaction can be the results of a dexterity test that can be performed by the customer using the mobile computer device 11. FIG. 8 shows one exemplary embodiment of a live verification test page 280 for presenting such a dexterity test. The live verification test page 280 includes a color test section 282, which displays a word 284 that describes a color and a keypad that includes key buttons 286 of various colors. When the customer selects a Begin Test button 288, the system will display word 284 that describes a color, and the customer must select the colored key button 286 that matches the described color. The customer's performance on the test, including the customer's response time and accuracy of response can be captured by the mobile device 11 and uploaded to the rental management computer system 16. To test the customer's dexterity, the live verification test page 280 can present one or a series of such tests.

Figure 14:
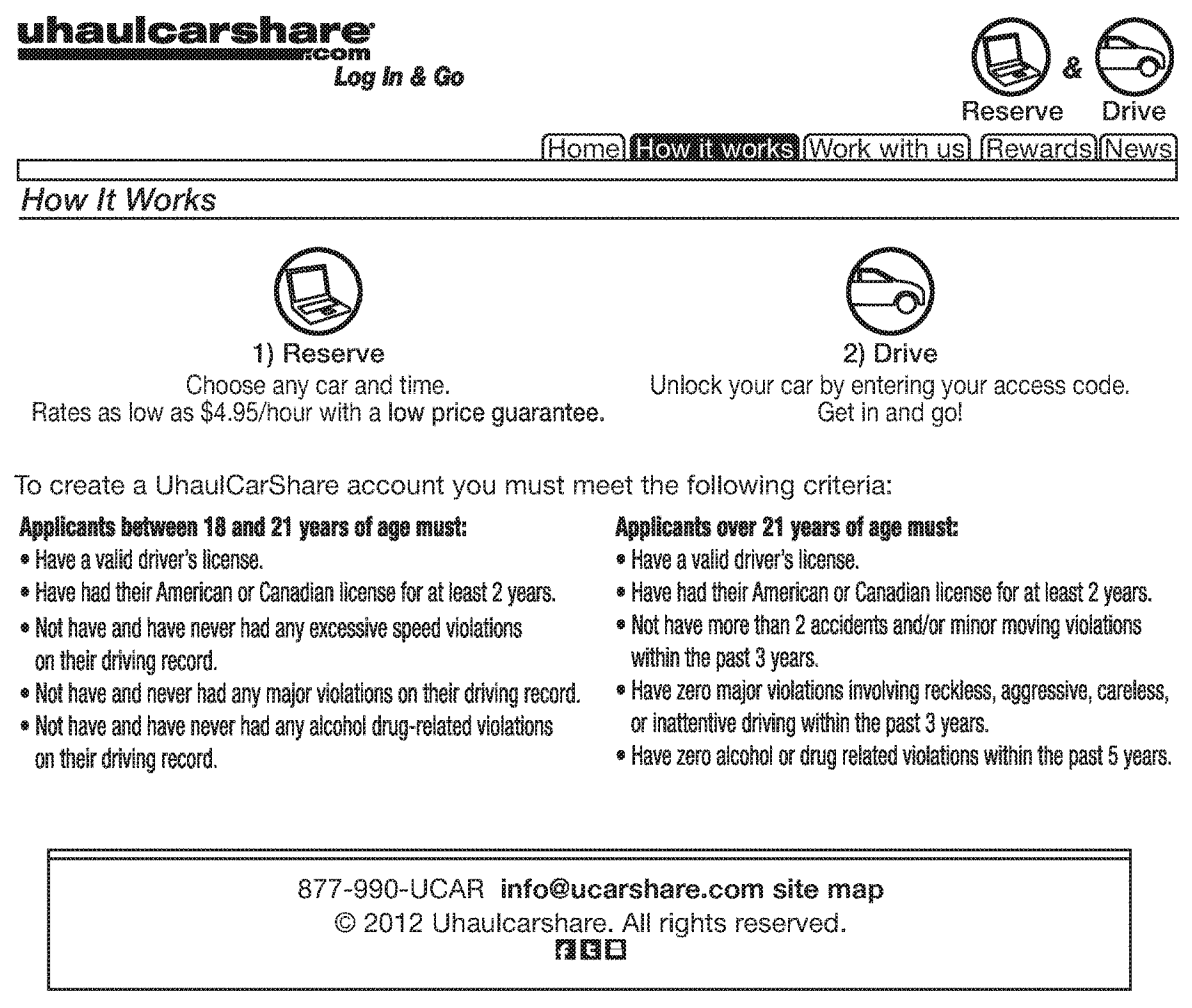

FIG. 14 shows an embodiment of an informational web page describing some criteria that a customer must meet in order to rent a vehicle according to one exemplary rental qualification process in accordance with the present invention.

Administrative Approval Interface

Figure 15A:
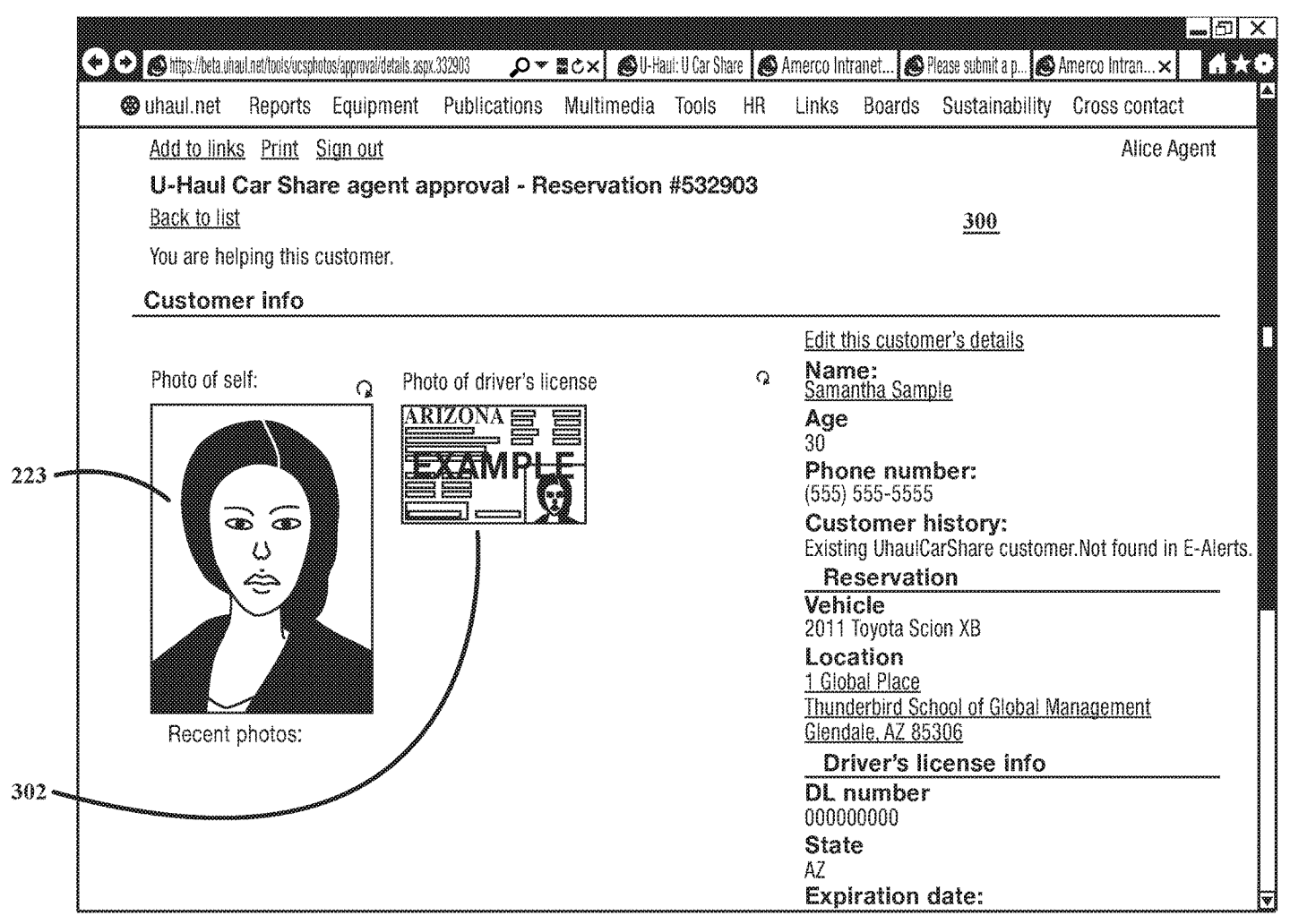
Figure 15B:

FIGS. 15A-15B show an exemplary embodiment of a screen display of an administrative approval web page 300 for use by an administrator in qualifying a rental customer. The administrator can use this web page 300 to view information stored in the database 30 relating to the customer qualification, including simultaneously displaying and comparing the customer's uploaded current photo 223 with his or her driver's license 302 (as shown in FIG. 15A), and to select buttons to approve the rental transaction 304, to deny the transaction 306 or to request more information from the customer 308 as described above.

Figure 16A:
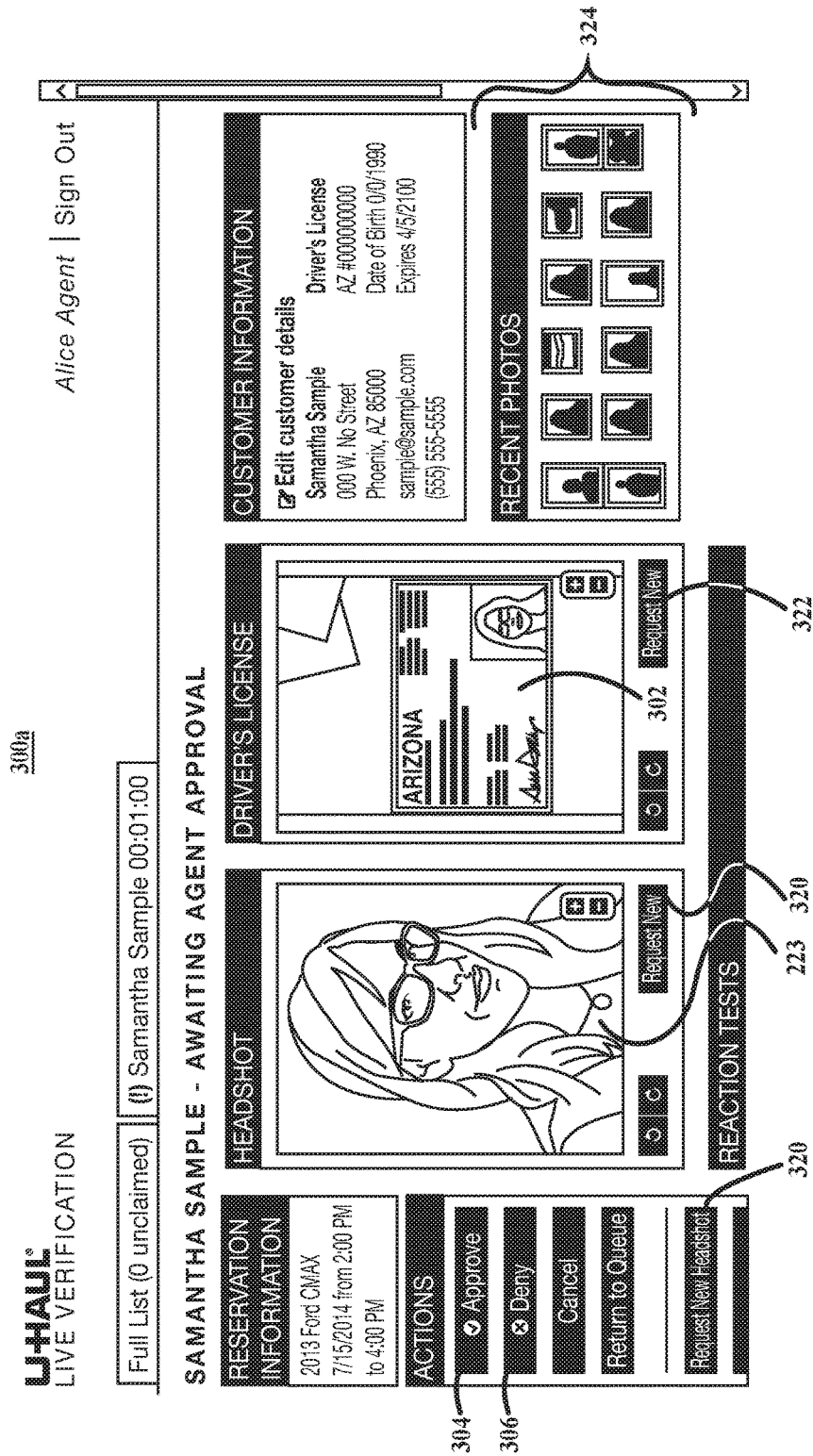
FIGS. 16A and 16B show another exemplary embodiment of an administrative approval web page in accordance with the present invention.
Figure 16B:
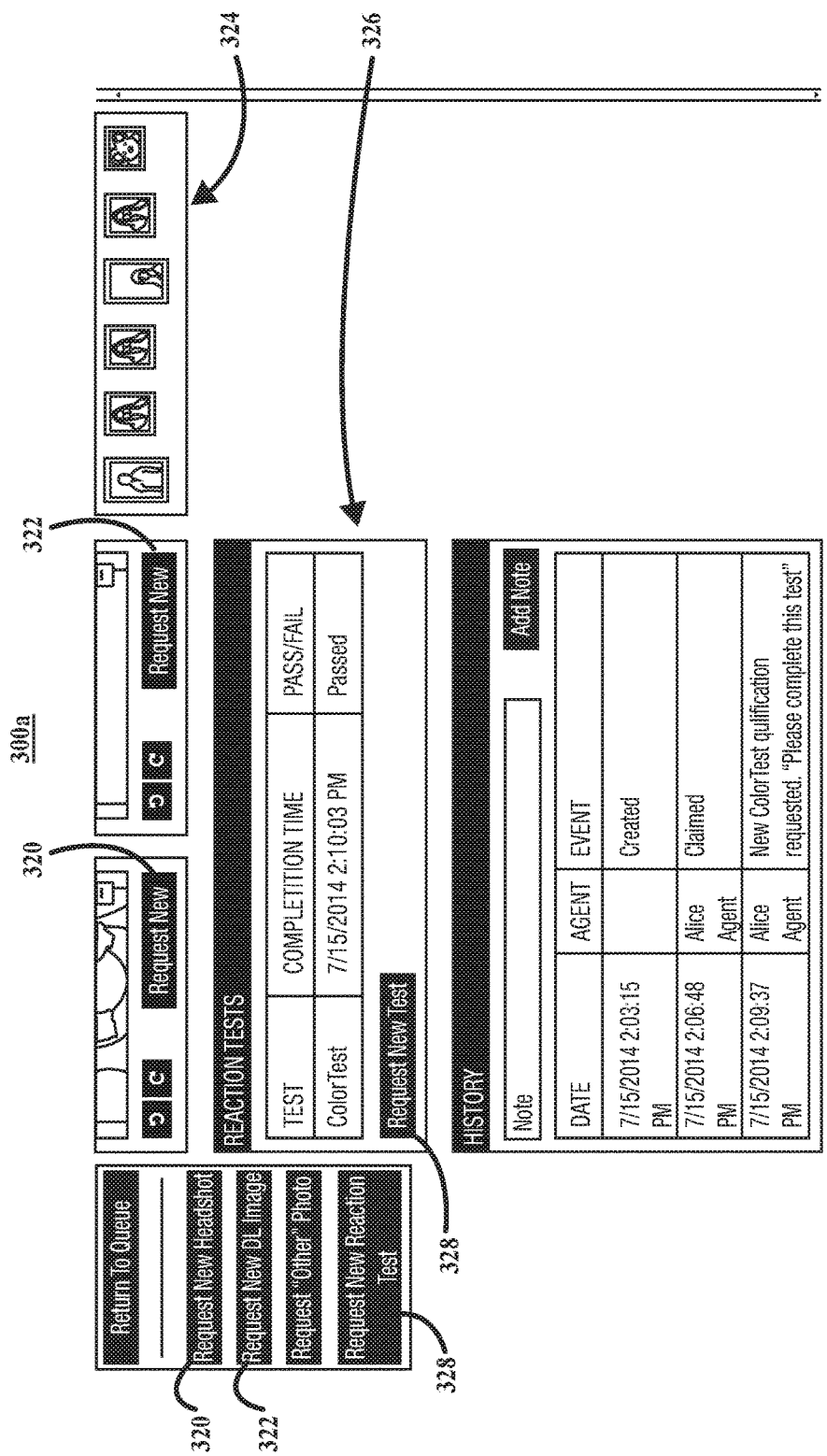

FIGS. 16A-16B show another exemplary embodiment of a screen display of an administrative approval web page 300a for use by an administrator in qualifying a customer for a rental transaction. Like the administrative approval web page 300 of FIG. 15, the administrator can use the web page 300a to view information stored in the database 30 relating to the customer qualification, including comparing the customer's uploaded current photo 223 with his or her driver's license 302 (as shown in FIG. 15A), and selecting buttons to approve the rental transaction 304, to deny the transaction 306 or to request more information from the customer 308 as described above. In addition, the administrative approval web page 300a includes selection buttons for requesting a new photo from the customer 320 and requesting a new driver's license image from the customer 322. Also, the administrative approval web page 300a includes a recent photos section 324 that displays recent photos of the customer stored in the database 30, which can be compared to the uploaded current photo 223, and a reaction test result section 326 that displays the results of the dexterity test taken by the customer. A Request New Test button 328 is provided to allow the administrator to request the customer to take a new dexterity test.

Customer Self-Dispatch and Self-Return

In a presently preferred embodiment and method of the invention, after the administrative approval process is complete, the customer can self-dispatch and self-return a rented vehicle using a mobile computer device 11 without requiring the physical presence of rental personnel at the dispatch or return sites, i.e., the rental dispatch and return processes can be "unattended" by rental personnel. With the self-dispatch feature, the customer can provide information regarding the mileage and fuel level of the rental vehicle with the customer's mobile computer device 11 when the customer arrives to pick up the vehicle. After the customer successfully completes the self-dispatch process, the system activates the reservation. With the self-return feature, the customer can provide all of the necessary information to return the vehicle and close the reservation using the customer's mobile computer device 11. With these features, no expensive equipment is required in the vehicle to track or communicate information regarding the rental. Rather, the customer's mobile device can be used to provide the information for dispatching and returning the rental vehicle. In some embodiments, the keys to the rental vehicle are locked inside a lockbox near the vehicle, and a lockbox access code is distributed to the customer during the self-dispatch process so the customer can retrieve the keys from the lockbox and during the self-return process so the customer can return the keys to the lockbox.

Figure 17:
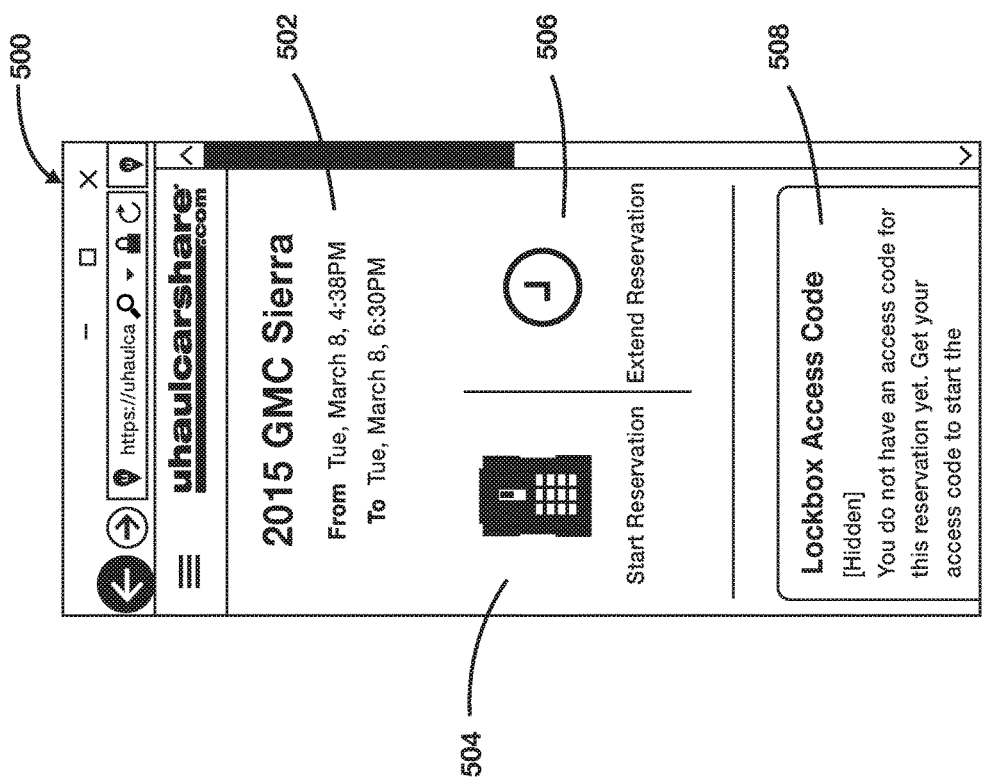
FIG. 17 shows an exemplary web page displayed on the screen of a mobile computer device for enabling a customer to start a rental vehicle reservation and begin the self-dispatching process according to the present invention.

Referring to FIGS. 17-23, the functionality and operation of the mobile computer device 11 will now be illustrated in connection with the self-dispatch and self-return features. FIG. 17 shows an exemplary web page 500 displayed on the screen of a mobile computer device for enabling a customer to initiate a self-dispatch of a rental vehicle. When the customer has an active reservation, the rental management computer system 16 can cause the customer's mobile computer device 11 to show the self-dispatch web page 500 on the screen of the mobile computer device, which depicts the customer's rental vehicle reservation and enables the customer to initiate the self-dispatch of a rental vehicle. The web page 500 includes a rental information display 502, a Start Reservation button 504, an Extend Reservation button 506, and a Lockbox Access Code section 508. The rental information display 502 can include basic information about the active reservation, such as the make and model of the rental vehicle and the term of the rental period. When the customer selects the Start Reservation button 504, the system will prompt the customer to report any existing damage to the exterior and interior of the rental vehicle.

Figure 18:
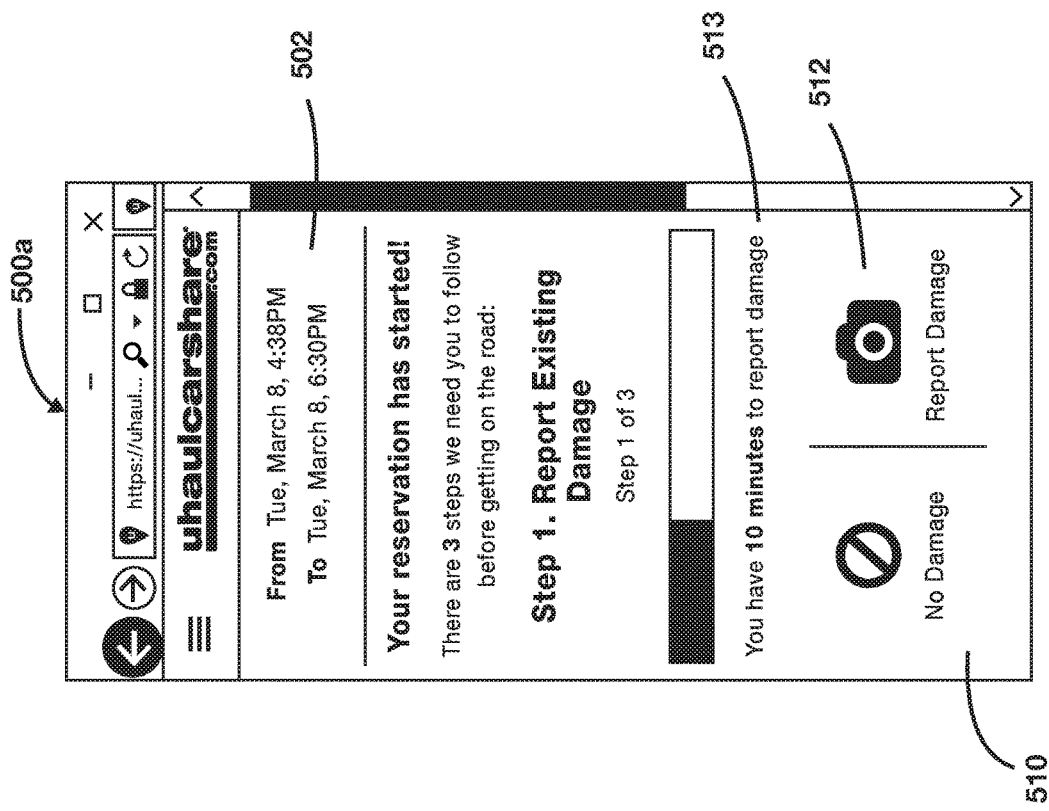
FIG. 18 shows an exemplary web page displayed on the screen of a mobile computer device for enabling a customer to report existing damage to a vehicle during the self-dispatching process.
Figure 19:
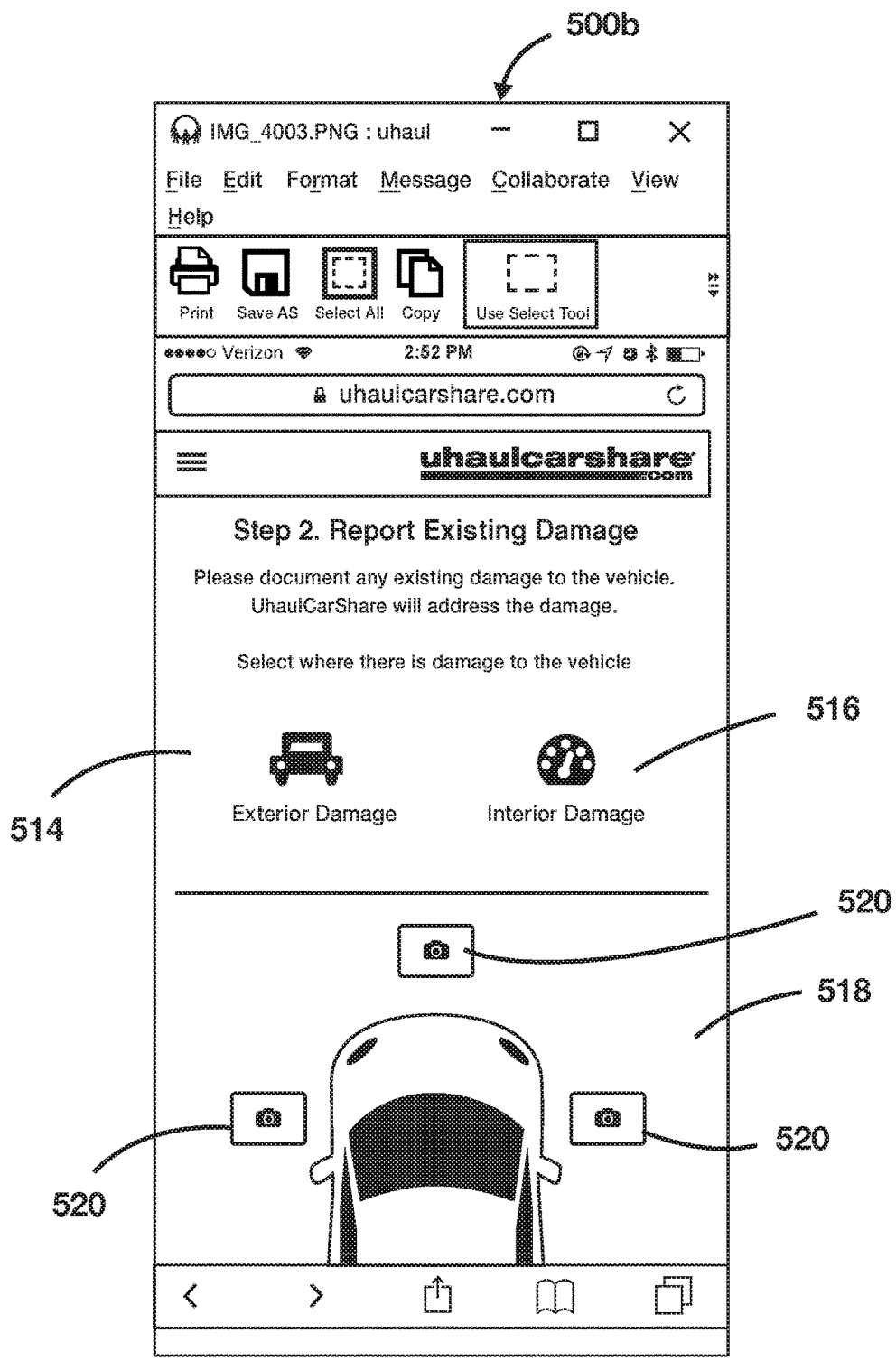
FIGS. 19 and 20 show an exemplary web page displayed on the screen of a mobile computer device for enabling a customer to report exterior damage to a vehicle during a self-dispatching process.
Figure 20:
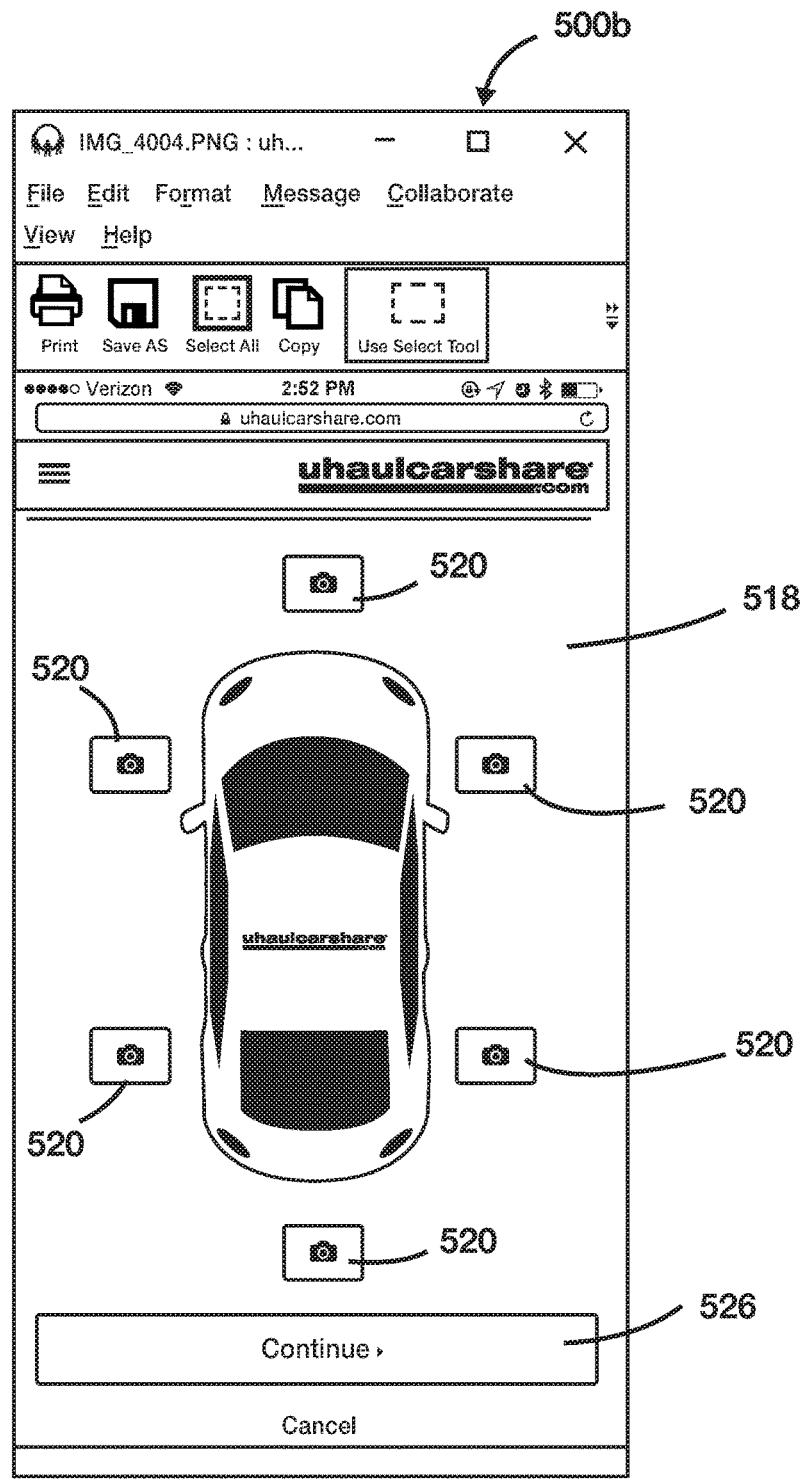
Figure 21:
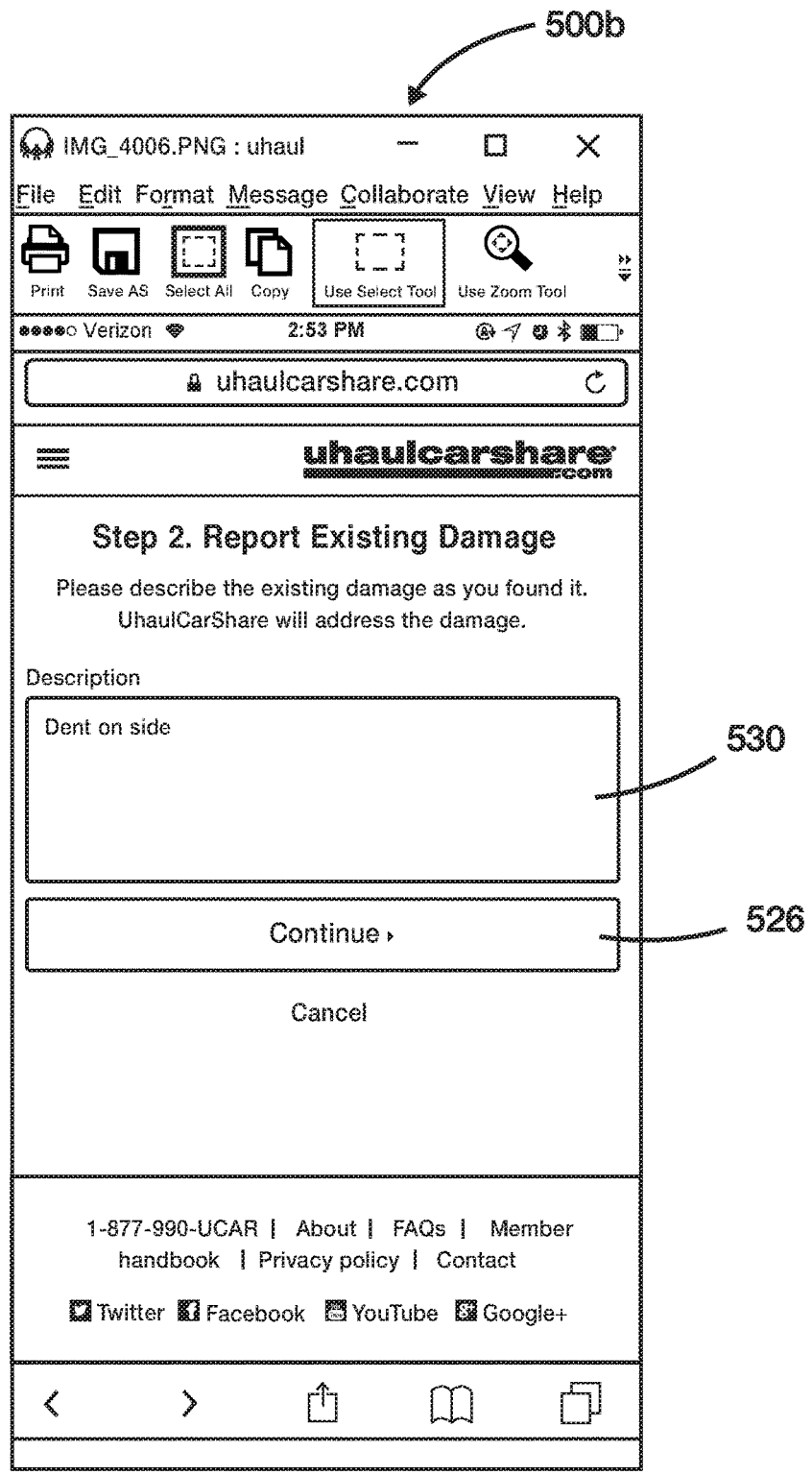
FIG. 21 shows an exemplary web page displayed on the screen of a mobile computer device for prompting a customer to describe the reported exterior damage to the vehicle during the self-dispatching process.
Figure 22:
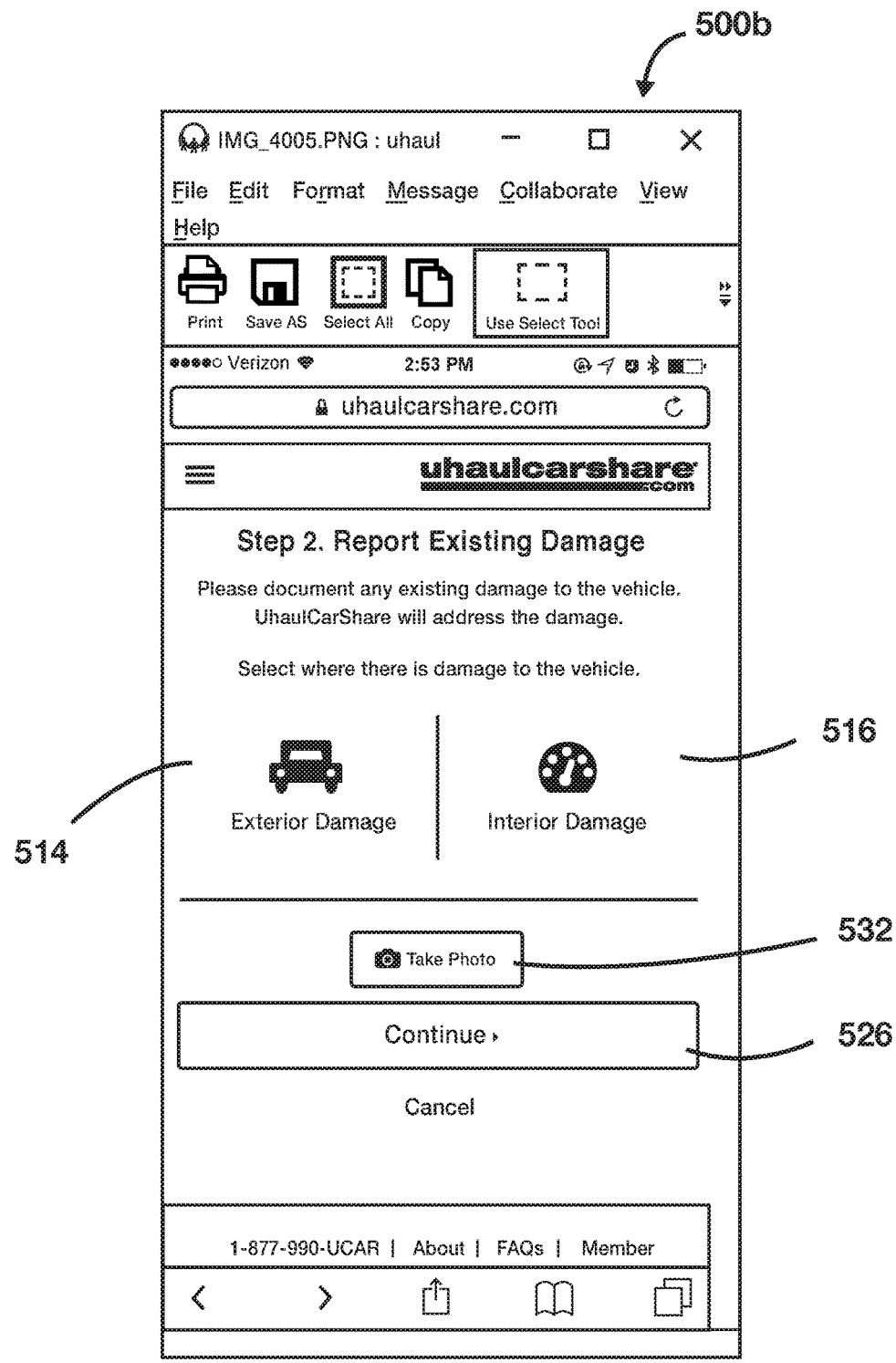
FIG. 22 shows an exemplary web page displayed on the screen of a mobile computer device for enabling a customer to report interior damage to a vehicle during the self-dispatching process.

FIG. 18 shows an exemplary web page 500a displayed on the screen of a mobile computer device for enabling a customer begin the process of reporting such damage. The web page 500a includes a No Damage button 510, a Report Damage button 512 and a time limit notification 513, which notifies the customer of an applicable time limit for reporting existing damage. This time limit can be set by an administrator of the rental management computer system 16. In the example shown in FIG. 18, this time limit is set at 10 minutes. Any damage reported after the time limit expires is considered new damage. If there is no damage to report, the customer can select the No Damage button 510 and the system will prompt the customer to input information about the mileage and fuel usage for the rental vehicle being returned, as described in more detail below. If the customer wishes to report any existing damage, he or she can select the Report Damage button 512, and the system will serve web pages to the customer mobile device to prompt the customer to document the damage.

FIGS. 19-22 show exemplary web pages 500b displayed on the screen of a mobile computer device for documenting existing damage during the self-dispatch process. The web page 500b includes an Exterior Damage button 514 and an Interior Damage button 516. When the Exterior Damage button 514 is selected, the system will display a vehicle diagram 518 with Photograph buttons 520 (see FIGS. 19-20), which enable the customer to select a general location on the vehicle where there is exterior damage. Clicking on the Photograph button 520 associated with the damage location enables the camera 46 on the mobile device 11, which the customer can then use to photograph the damage. After the customer takes a photograph, the system 16 will prompt him or her to upload the photograph, after which the system 16 will prompt the customer to describe the damage via a text box 530 (see FIG. 21). Referring again to FIG. 19, when the Interior Damage button 514 is selected, the system will display a Take Photo button 532 (see FIG. 22) that functions similar to the Photograph buttons 520 to enable the customer to photograph and describe interior damage to the vehicle during the self-dispatching process.

Figure 23:
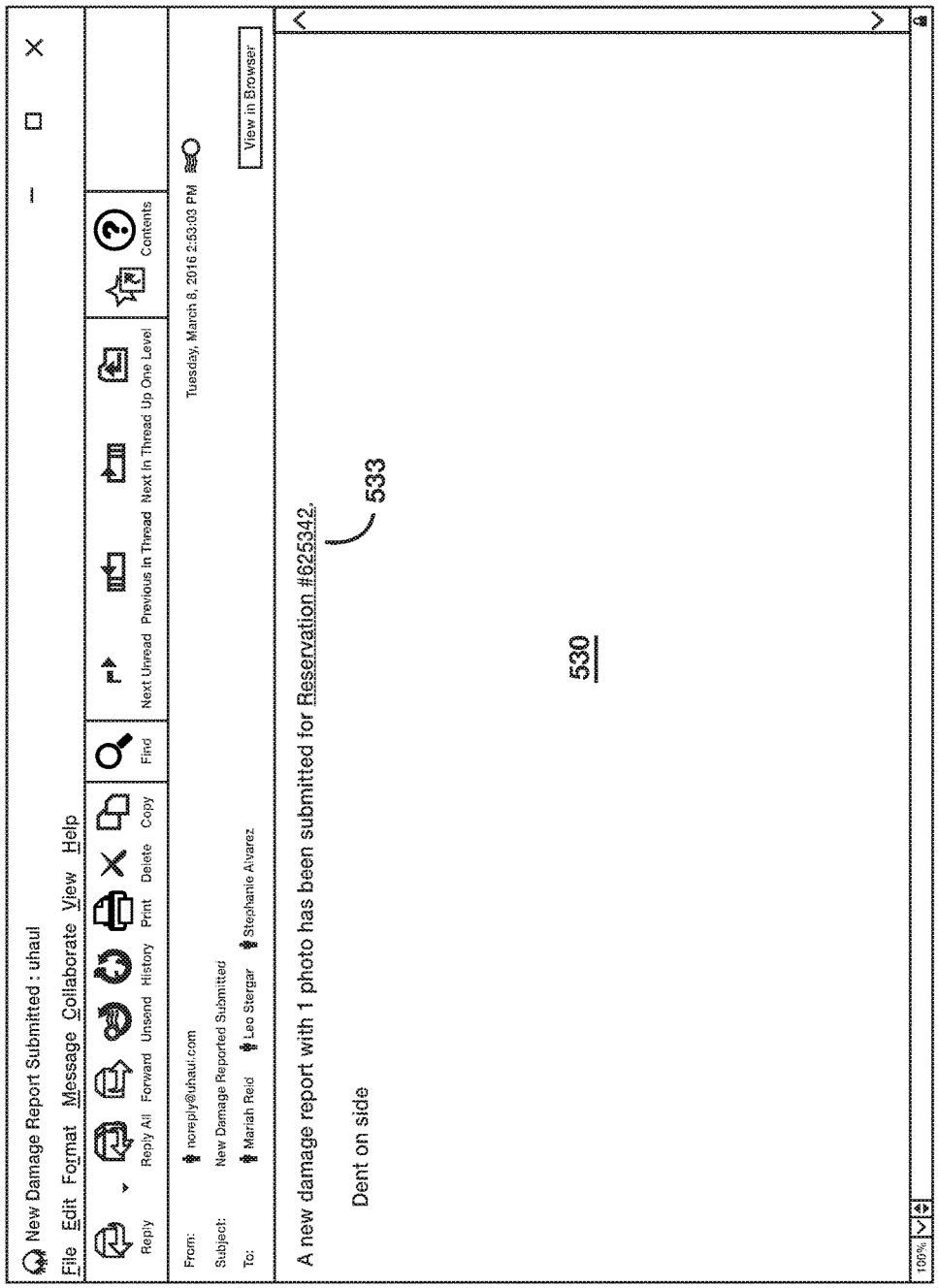
FIG. 23 shows an example of an email that is automatically generated during the self-dispatching process for submitting a vehicle damage report.

After the customer has completed photographing and describing the existing damage to the exterior and interior of the rental vehicle, the mobile device can automatically generate an email for reporting the existing damage to the administrator of the rental management computer system 16. FIG. 23 shows an example of such an email 530 that has been automatically generated during a self-dispatching process for submitting a vehicle damage report. In the embodiment of this example, the email 530 automatically includes a reservation number link 533, which enables the administrator to display a Reservation Information screen for the specific reservation.

Figure 24A:
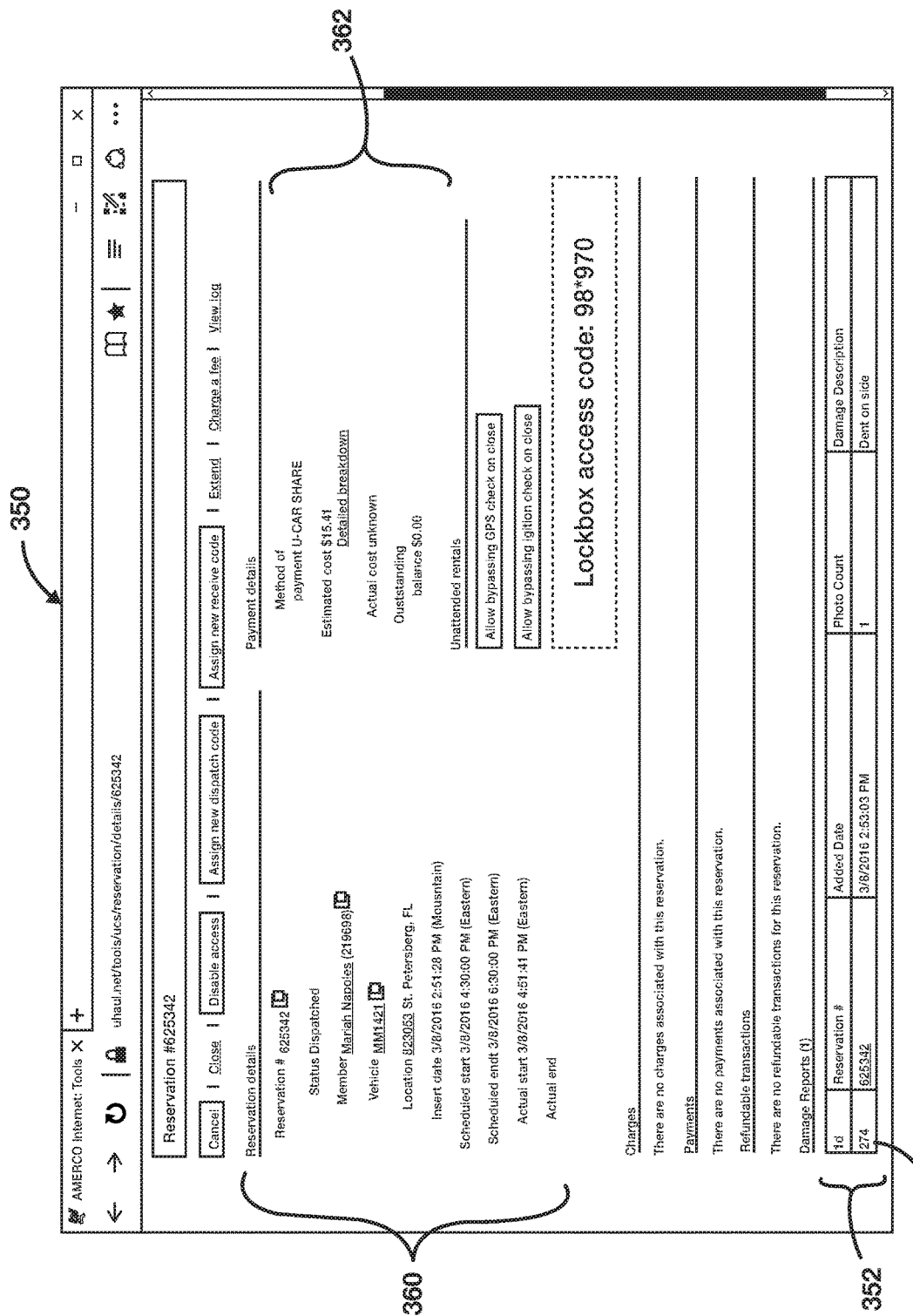
FIG. 24A shows an exemplary web page displayed on a computer screen for an administrator to view reservation information stored by the system, which includes a link to a damage report submitted by a customer during the self-dispatching process.
Figure 24B:
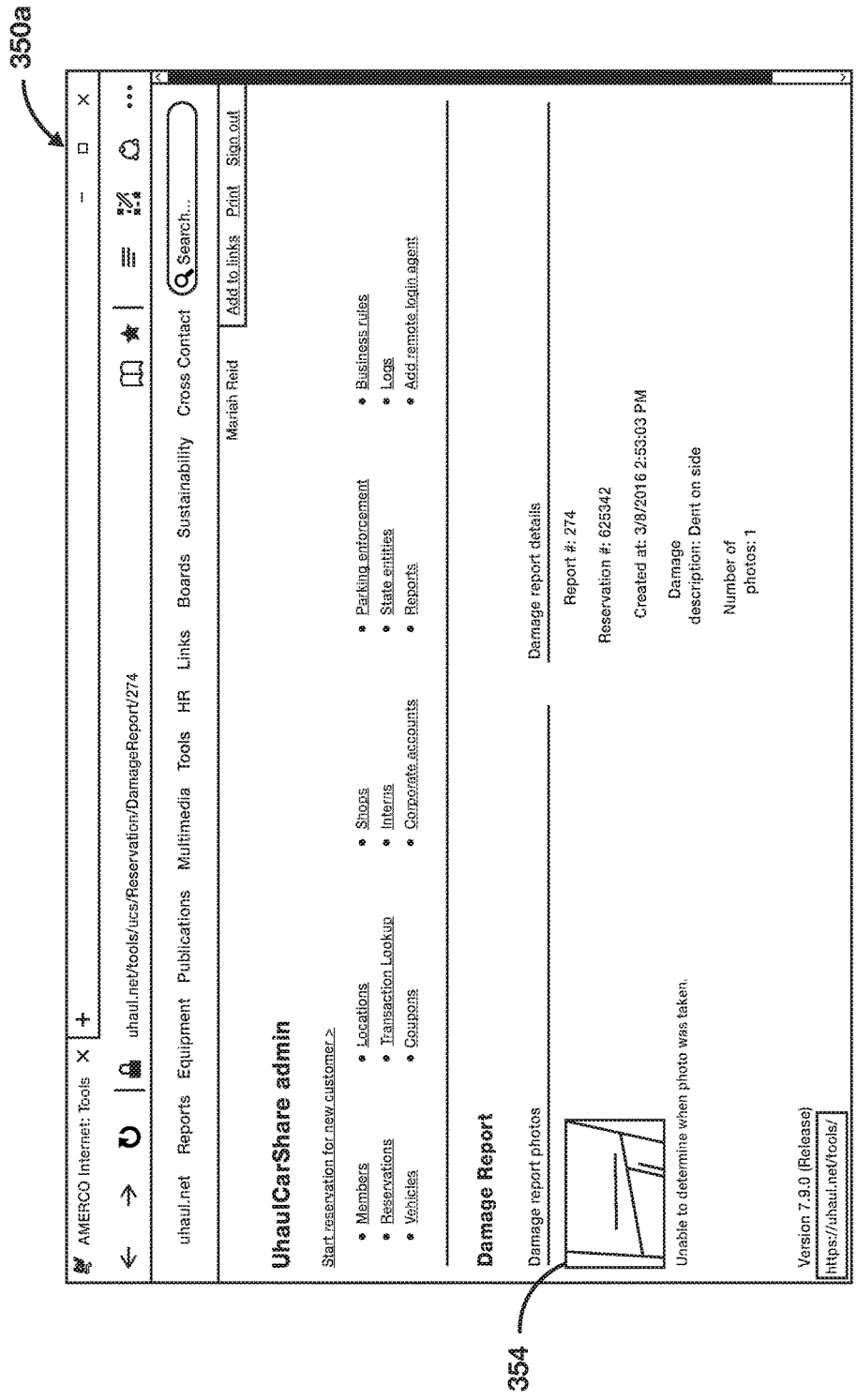
FIG. 24B shows an exemplary web page displayed on a computer screen for an administrator to view a damage report submitted by a customer during the self-dispatching process.

FIG. 24A shows an exemplary embodiment of a Reservation Information screen 350 for displaying reservation information to an administrator, including damage reports submitted by a customer for a rental vehicle during the self-dispatch process. The Reservation Information screen 350 includes a Reservation Details section 360, a Payment Details section 362, and a Damage Reports section 352 that includes a Damage Report ID link 353 associated with each damage report. Clicking on the Damage Report ID link 353 causes the system 16 to display more detailed information about the associated damage report. FIG. 24B shows one exemplary embodiment of a Damage Report screen 350a for displaying such detailed information for the selected damage report, including existing damage report photos 354 taken by the customer during the self-dispatch process described above.

Figure 25:
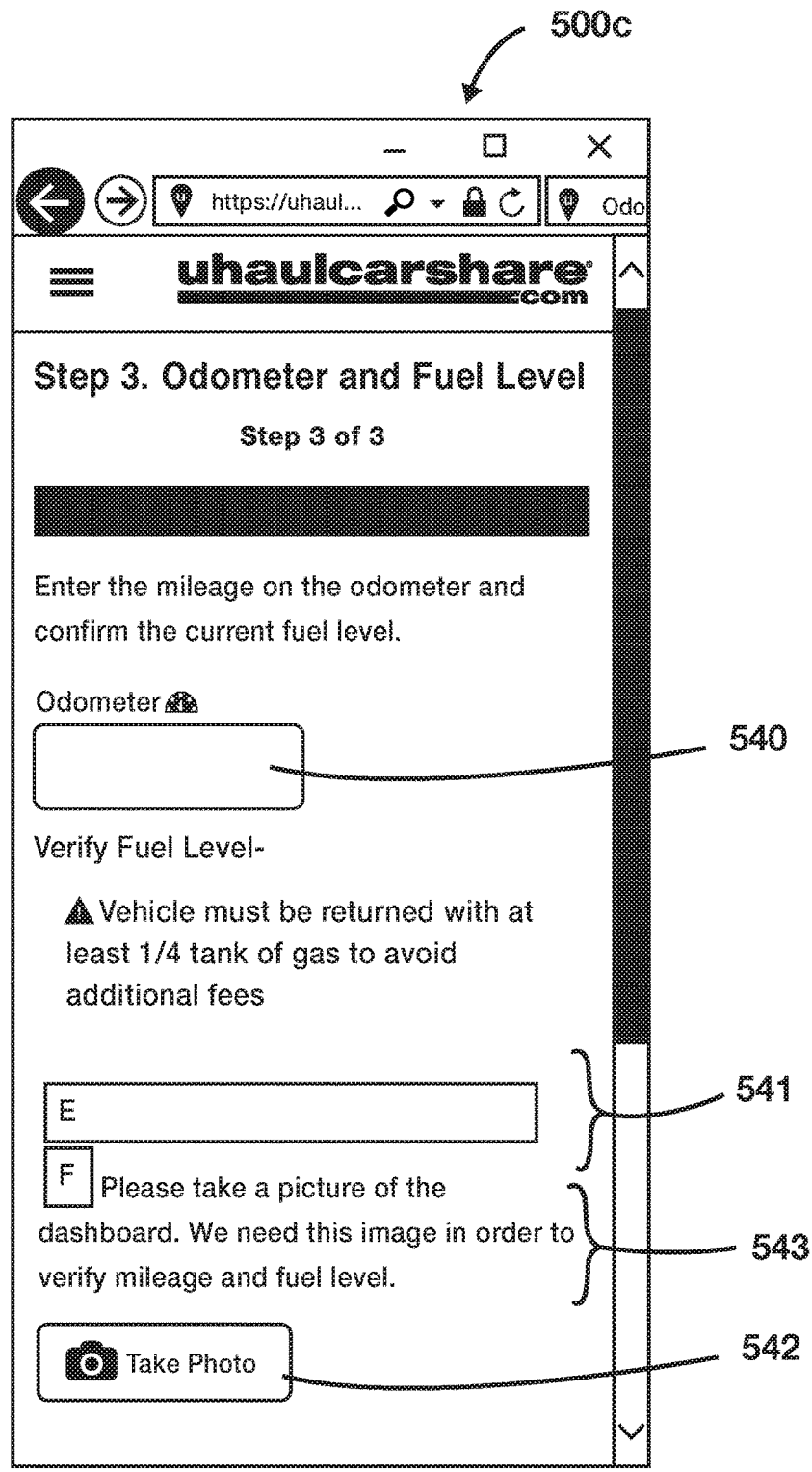
FIG. 25 shows an exemplary web page displayed on the screen of a mobile computer device for prompting the customer to enter mileage and fuel level information for the rental vehicle during the self-dispatch process.

After the customer has completed the process of reporting existing damage, the customer is prompted to input information about the mileage and fuel usage for the rental vehicle being returned. FIG. 25 shows an exemplary web page 500c displayed on the screen of the mobile computer device 11 for this purpose. The web page 500c includes a mileage entry field 540, a fuel level input selection 541, and a Take Photo button 542 and instructions 543 to the customer to take picture of the dashboard with the mobile computer device 11 showing mileage and fuel usage. This information is uploaded to the system 16 via a process that is similar to that described above, and the self-dispatch process is completed, thereby activating (i.e., starting) the reservation.

Figure 26:
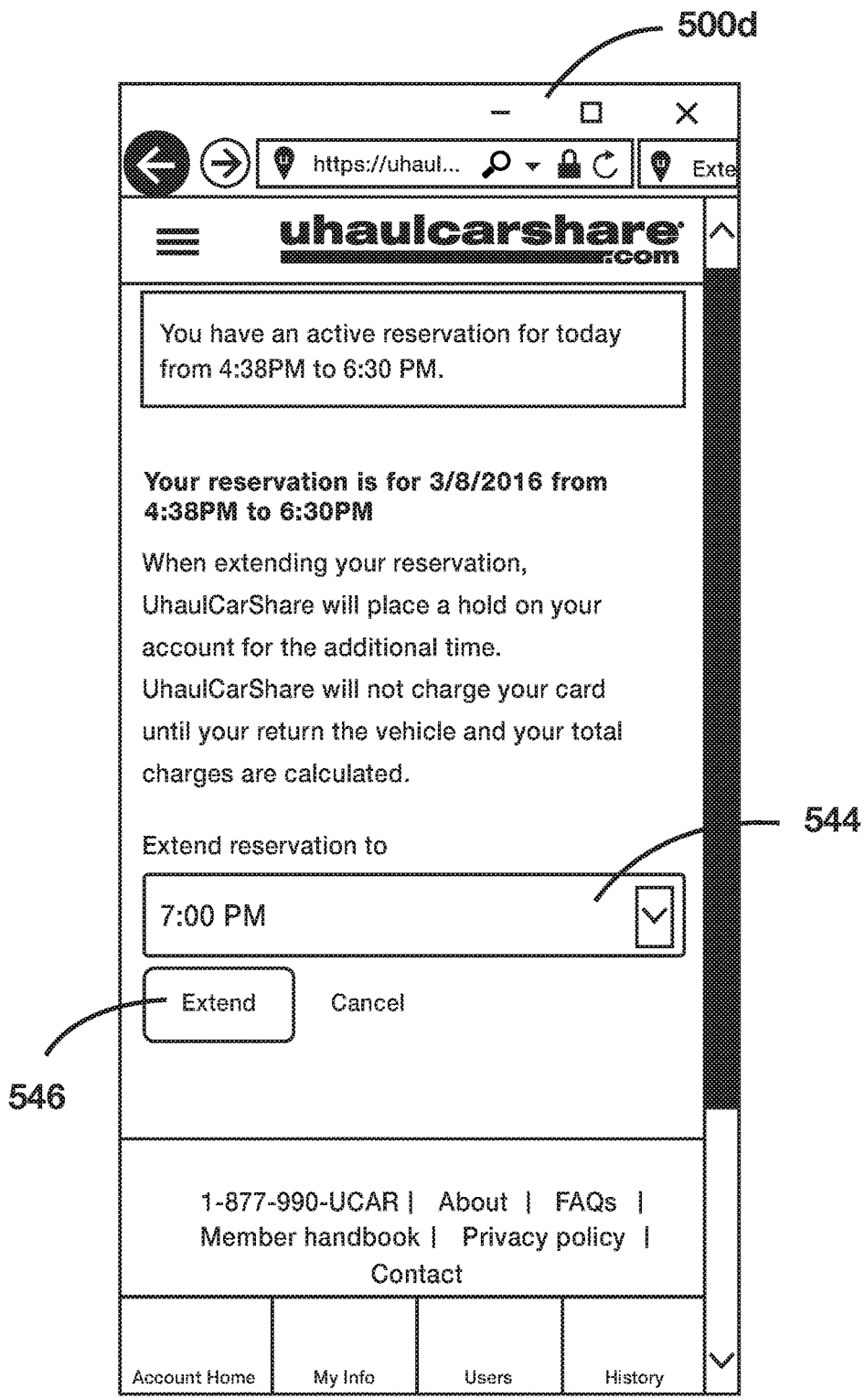
FIG. 26 shows an exemplary web page displayed on the screen of a mobile computer device for enabling a customer to extend a reservation in accordance with the present invention.

After a reservation has been activated, the customer can return the vehicle or extend the term of the reservation. Referring again to FIG. 17 one example of a mobile web page for doing so is illustrated. To see if the reserved vehicle is available for such an extension and to choose a time period for the extension for example, the customer can select the Extend Reservation button 614. In response, in one embodiment, the system 16 serves a reservation extension web page 500d like that shown in FIG. 26, which is displayed on the screen of a mobile computer device 11 and includes an extension time drop down list 544 and an Extend button 546. The customer can use to drop down list 544 to select a new end time for the reservation, and can extend the reservation by selecting the Extend button 546 to send the new reservation end time to the system 16. In some preferred embodiments, the system automatically determines whether an extension is available. To implement this feature, a set time interval (e.g, 30 minutes) is maintained between consecutive reservations of a given vehicle. When an extension is requested, the system determines whether there are any future reservations for the vehicle. If there are none, the system automatically allows the customer to extend the current reservation to the current customer's new requested reservation end time. If there are future reservations for the vehicle, the system allows the customer to extend the current reservation to a new requested reservation end time so long as that end time is at least 30 minutes before the next customer reservation.

Figure 27A:
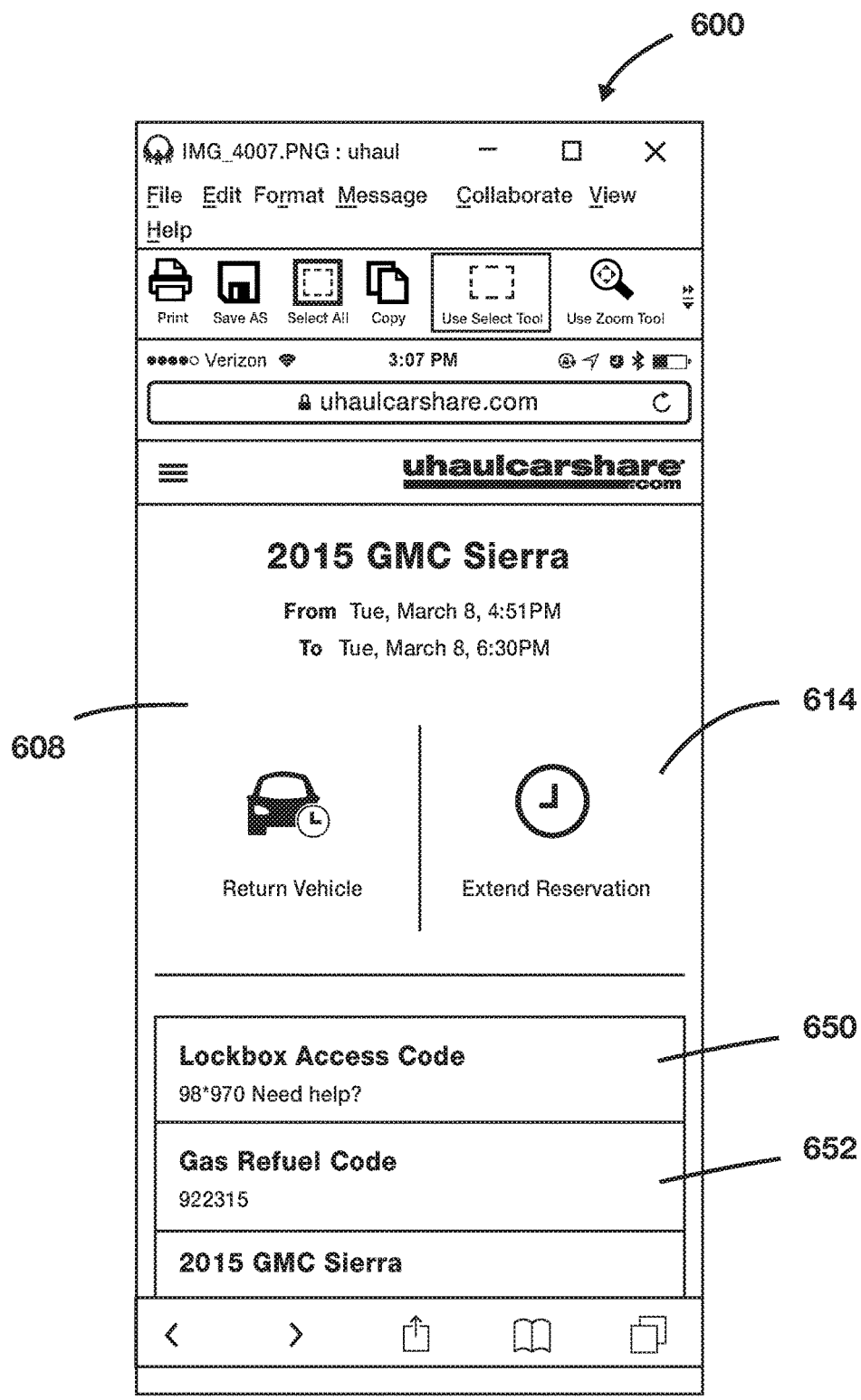
FIGS. 27A and 27B show two different embodiments of an exemplary web page displayed on the screen of a mobile computer device for enabling a customer to initiate a self-return of a rental vehicle in accordance with the present invention.
Figure 27B:
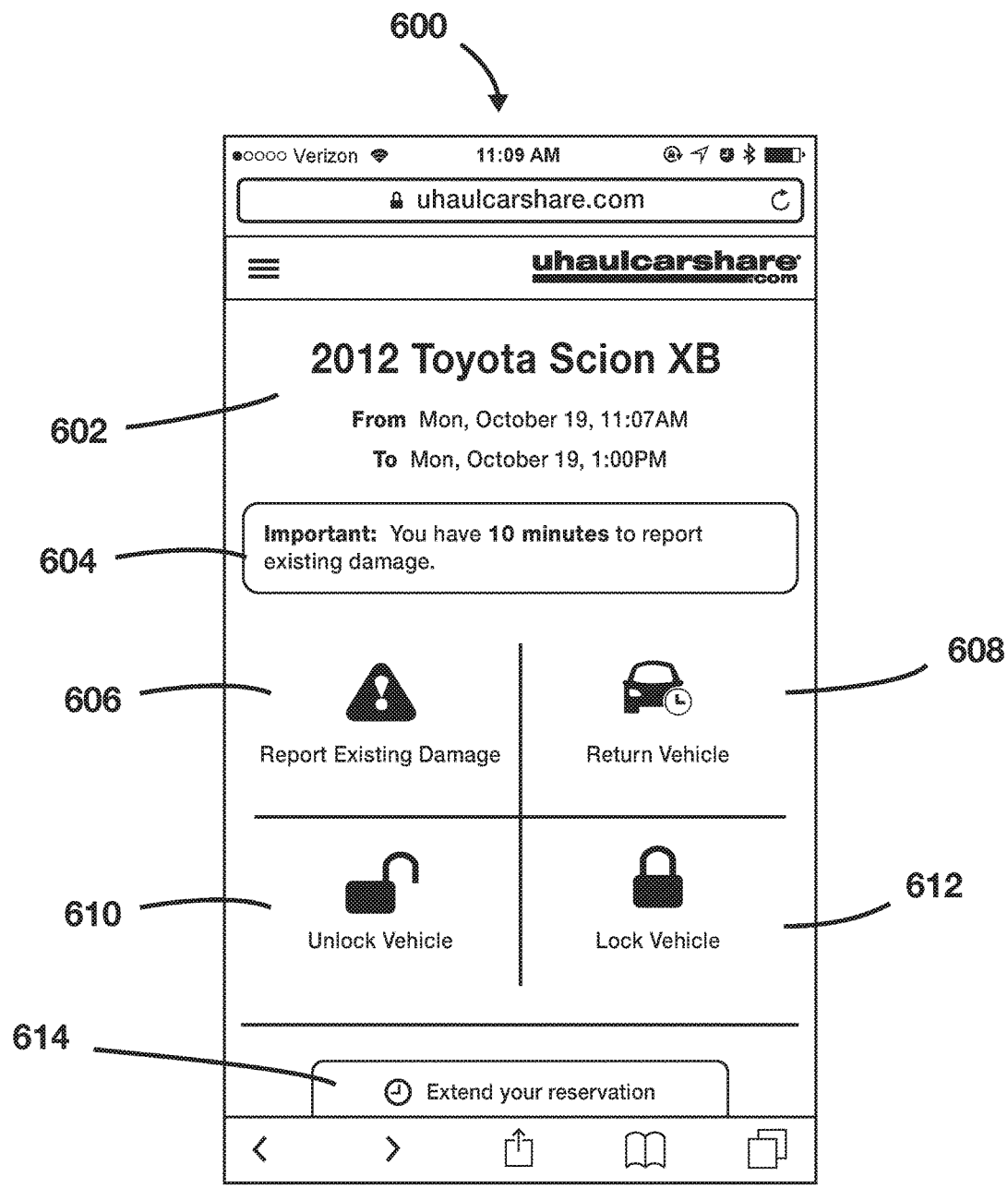

After a reservation has been activated, the customer also can use the mobile computer device 11 to initiate the self-return process. FIGS. 27A and 27B show two different embodiments of an exemplary self-return web page 600 displayed on the screen of a mobile computer device 11 for enabling a customer to initiate the self-return of a rental vehicle. When the customer has an active reservation, the rental management computer system 16 can cause the customer's mobile computer device 11 to display the self-return web page 600. In the embodiment of FIG. 27B, the web page 600 includes a rental information display 602, a customer notification section 604, a Report Existing Damage button 606, a Return Vehicle button 608, an Unlock Vehicle button 610, a Lock Vehicle button 612 and an Extend Reservation button 614. The rental information display 602 can include basic information about the rental, such as the make and model of the rental vehicle and the term of the rental period. The customer notification section 604 can display important information to the customer, such as a time limit for reporting existing damage, which time limit can be set by an administrator of the rental management computer system 16. In the example shown in FIG. 27B, this time limit is set at 10 minutes. Any damage reported after the time limit expires is considered new damage. As shown in the embodiment of FIG. 27A, the self-return web page can also include a Lockbox Access Code 650, as discussed above, and a Refueling Code 652 for refueling the vehicle.

Figure 28:
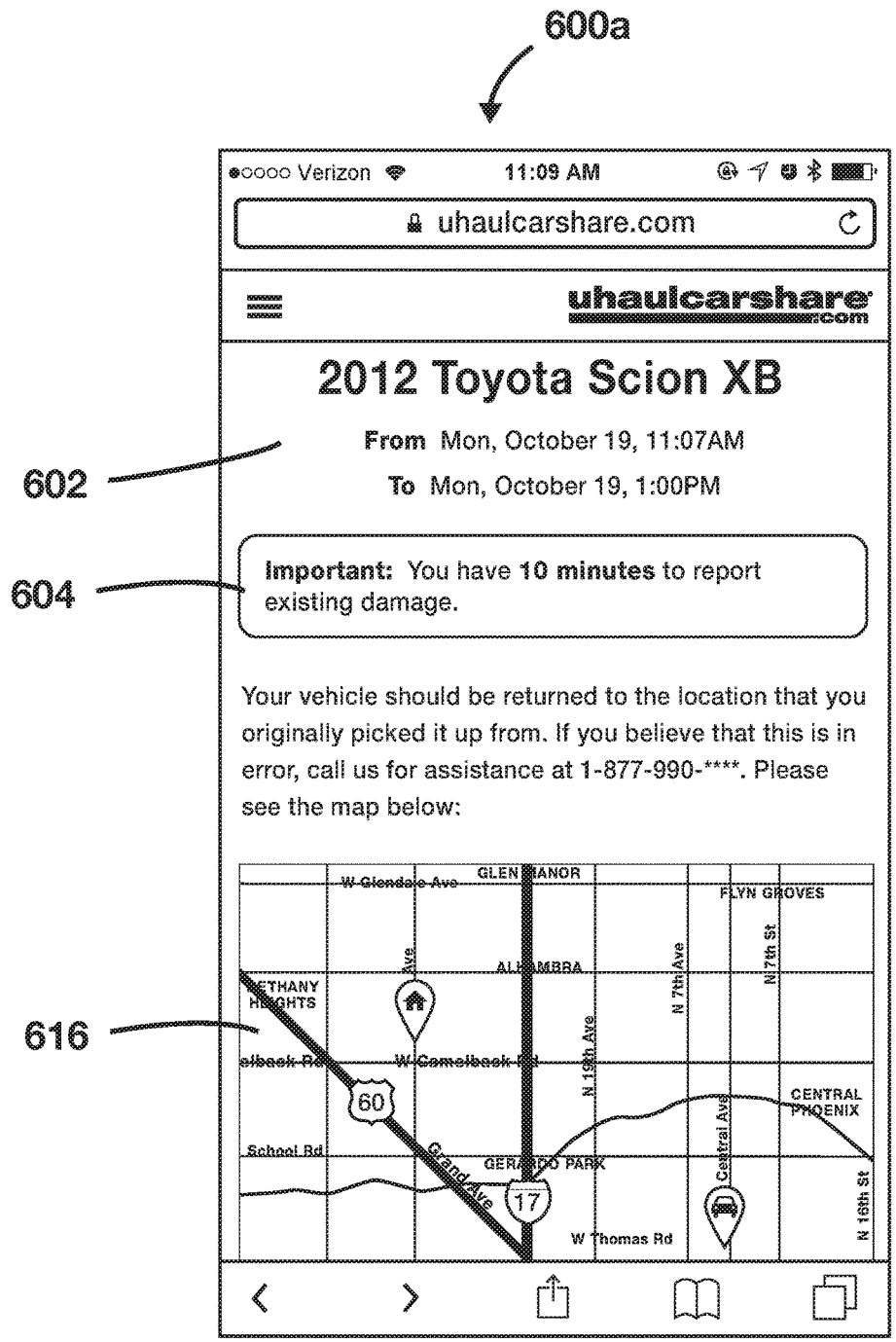
FIG. 28 shows an exemplary return location web page displayed on the screen of a mobile computer device, which displays information about the vehicle return location.

Still referring to FIGS. 27A and 27B, a customer who wishes to return the rental vehicle initiates the return process by selecting the Return Vehicle button 608. If the customer is done with the rental vehicle early, he or she can start the return process before the end of the rental time period. When the customer selects the Return Vehicle button 608, the system 16 causes the mobile computer device 11 to display a return location web page 600a which includes information about the location where the vehicle must be returned. As shown in the exemplary embodiment of FIG. 28, if the GPS information (discussed below) from the customer's mobile device 11 does not match the location where the customer originally picked up the vehicle, the return location page 600a can display a message advising the customer that the vehicle should be returned to the location where the customer originally picked up the vehicle. Also, as shown in FIG. 28, the return location web page 600a can include a map 616 that displays the return location.

Figure 29A:
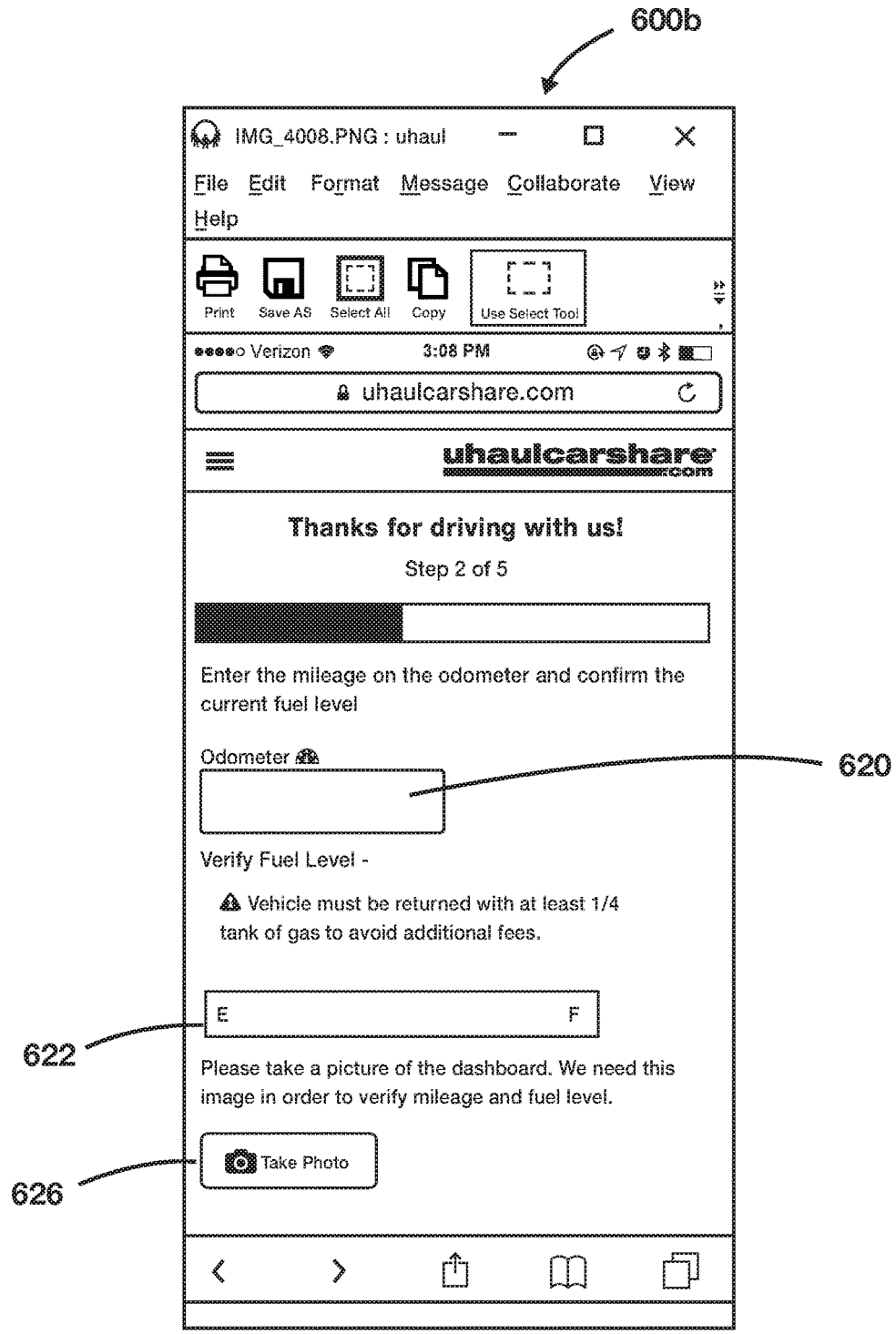
FIGS. 29A and 29B show two different embodiments of an information entry web page displayed on the screen of a mobile computer device for prompting the customer to enter mileage and fuel level information for the rental vehicle being returned.
Figure 29B:
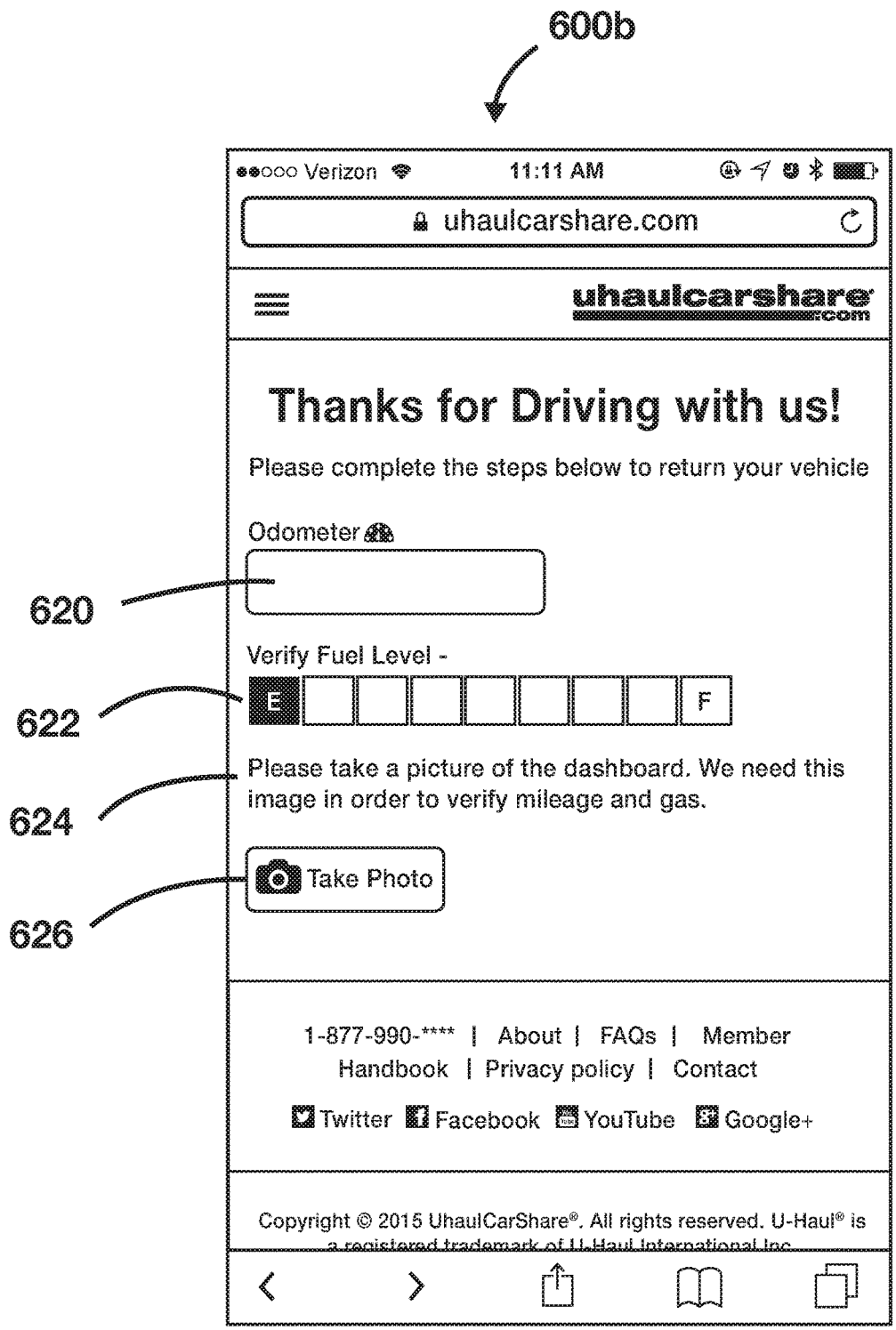
Figure 30:
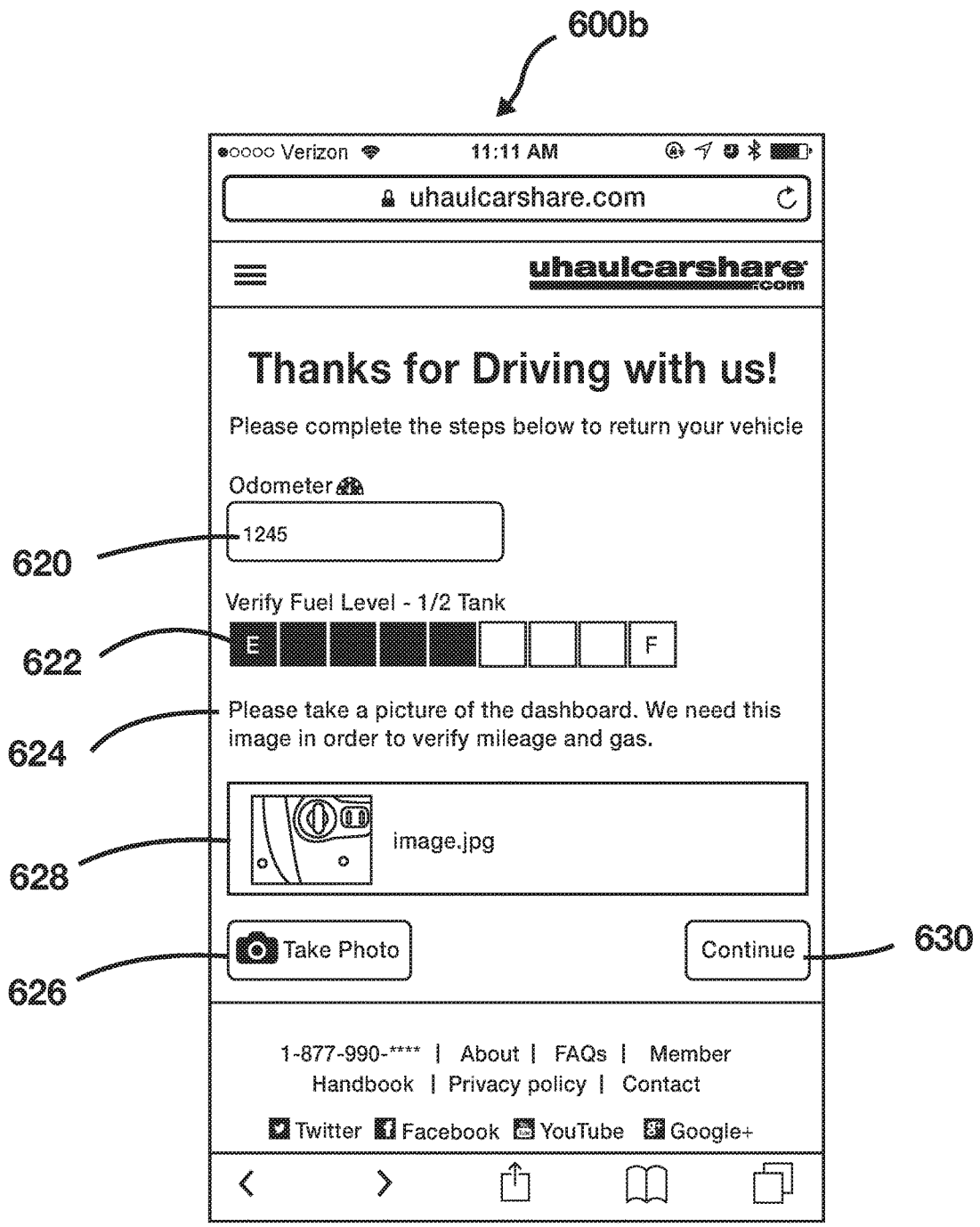
FIG. 30 shows the information entry web page of FIG. 29B displaying exemplary information entered by a customer during the self-return process, including a digital image taken of the vehicle dashboard.

After arriving at the return location, the customer is prompted to input information about the mileage and fuel usage for the rental vehicle being returned. FIGS. 29A and 29B show separate embodiments of a web page displayed on the screen of a mobile computer device 11 for this purpose. The web page 600b includes a mileage entry field 620, a fuel level input selection 622, a Take Photo button 626 and instructions 624 to the customer to take picture of the dashboard with the mobile computer device 11 showing mileage and fuel usage. FIG. 30 shows the web page 600b of FIG. 29B displaying exemplary information entered by a customer, including a digital image taken of the vehicle dashboard along with date and time stamp information associated with the image.

As shown in FIG. 30, after the digital image of the vehicle dashboard is captured, the web page 600b displays a Continue button 630, which the customer selects to submit to the rental management computer system 16 the mileage and fuel usage information (including date and time stamp information) and GPS location information for the mobile computer device 11. The system 16 confirms the GPS location and if the vehicle needs to be moved, the customer can be contacted (e.g., via text message or email) to instruct the customer where to leave the vehicle, to offer an extension of the rental period (if the rental vehicle is not scheduled for someone else), and/or to request the customer to call the rental company to determine how much longer the customer will need the vehicle. To confirm the GPS location, the rental management computer system 16 automatically accesses GPS information on the mobile computer device 11 for comparison with the stored location information associated with the rental (i.e., where the rental vehicle was supposed to be returned). If the customer does not allow access to GPS information of the mobile computer device 11, the rental management computer system 16 can send a request to the mobile computer device 11 for permission to access that information and advises the customer that such permission is necessary to complete the self-return.

Figure 31:
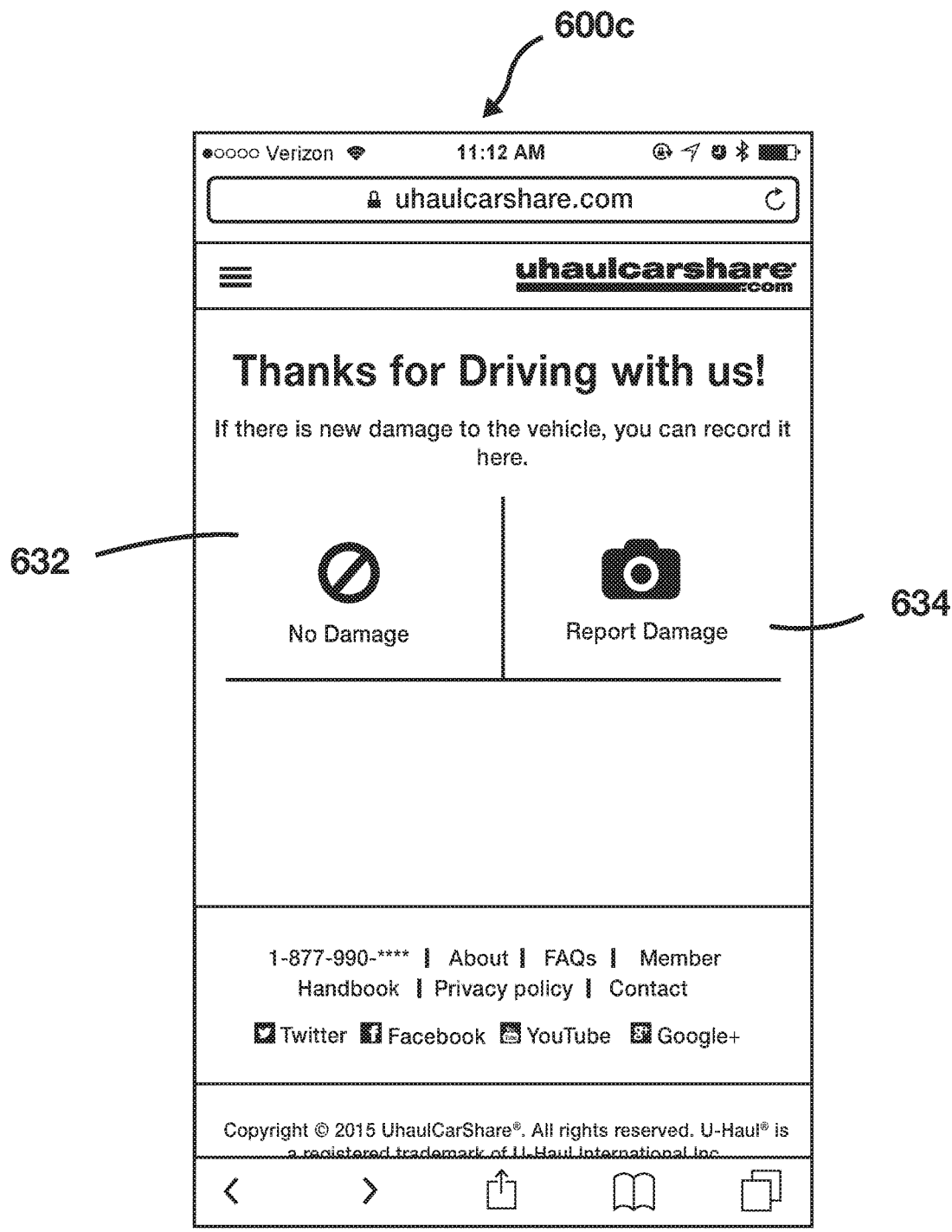
FIG. 31 shows an exemplary damage report web page displayed on the screen of a mobile computer device, which prompts the customer to enter information regarding any new damage to the vehicle being returned.

During the self-return process, the customer also uses his or her mobile device 11 to enter information regarding any new damage to the vehicle that occurred during the rental period. FIG. 31 shows an exemplary damage report web page 600c displayed on the screen of the mobile computer device 11 for this purpose. The web page 600c includes a No Damage button 632 and a Report Damage button 634. If there has been no new damage to the vehicle during the rental period, the customer can select the No Damage button 632 to report to the rental management computer system 16 that there has been no new damage. If there is new damage, the customer can select the Report Damage button to submit a damage report to the rental management computer system 16.

Also during the self-return process, the customer can be prompted to answer questions regarding the condition of the rental vehicle being returned and the customer's experience. FIG. 32 shows an exemplary vehicle questionnaire web page 600d displayed on the screen of the mobile computer device 11 for this purpose. The web page 600d includes a questionnaire section 636 with a series of yes/no questions for the customer to answer and a Done button 638 which the customer can select to submit his or her responses.

After the foregoing information is provided, the rental management computer system 16 can complete the self-return process by: (i) calculating the rental amount to be charged based, at least in part, on the rental time period and mileage information described above, (ii) charging the customer's account accordingly, and (iii) sending information about the charges to the mobile computer device 11 for the customer to view. These charges can include, by way of example, a charge based on the time period that rental vehicle was being used, a charge based on the mileage, a late charge if the vehicle was returned after the end of the rental time period and a charge for applicable taxes. Refueling charges can be handled various ways. According to one exemplary process, the vehicle must be returned with at least a ¼ tank of fuel and if it is not, the customer is charged a fee that is agreed to by the customer at the time of the reservation or dispatch. According to another exemplary process, the vehicle must be returned with the fuel level the same as it was on dispatch, which is agreed to by the customer at the time of dispatch.

Figure 33:
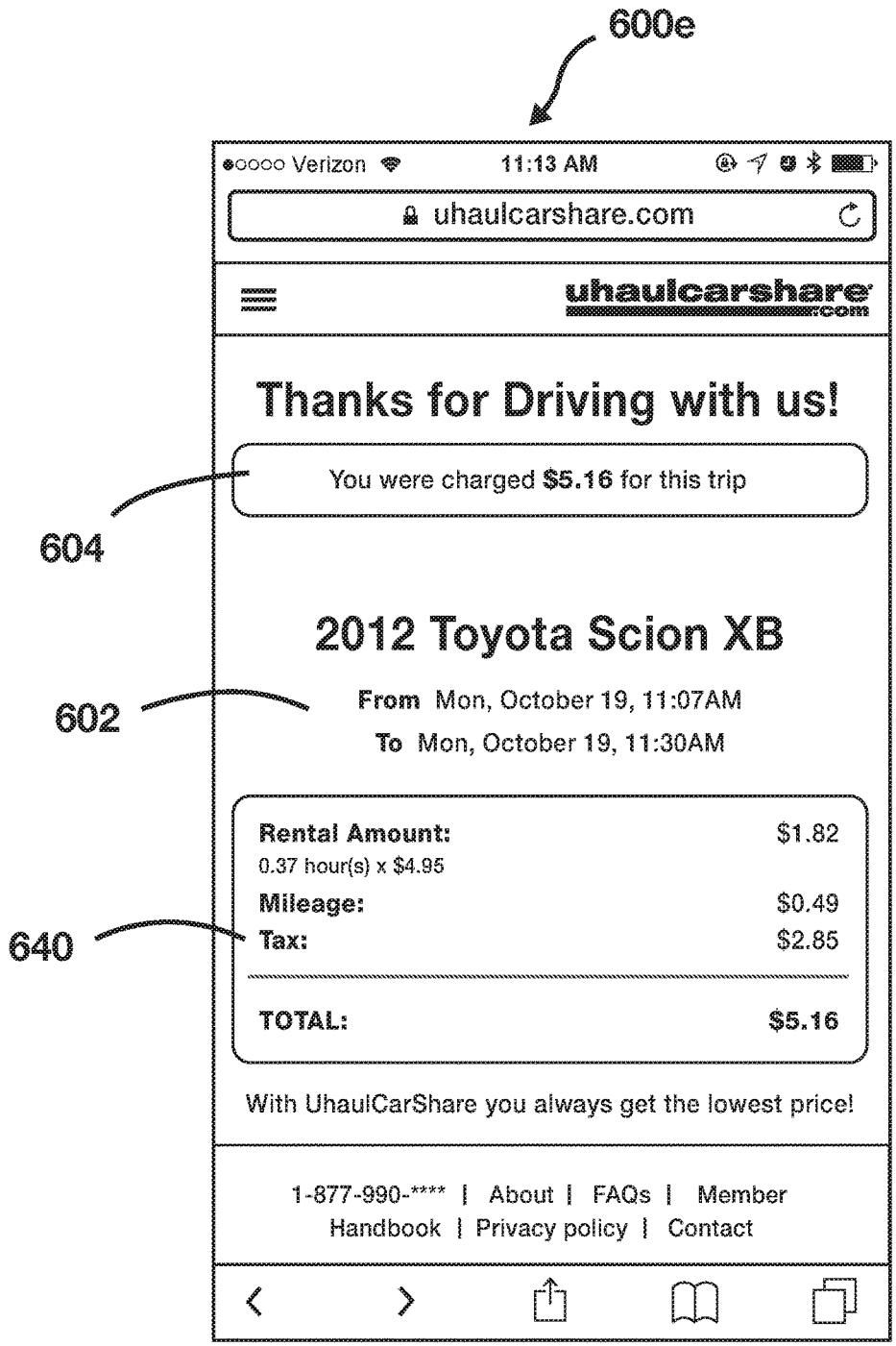
FIG. 33 shows an exemplary mobile version of a rental completion web page displayed on the screen of the mobile computer device, which displays the charges for the rental vehicle being returned.

FIG. 33 shows an exemplary rental completion web page 600e displayed on the screen of the mobile computer device 11 for this purpose. As shown in FIG. 33, the web page 600e can display the total charges in the customer notification section 604 and can include a charge detail section 640 that displays details of how the total charges are calculated.

Figure 34A:
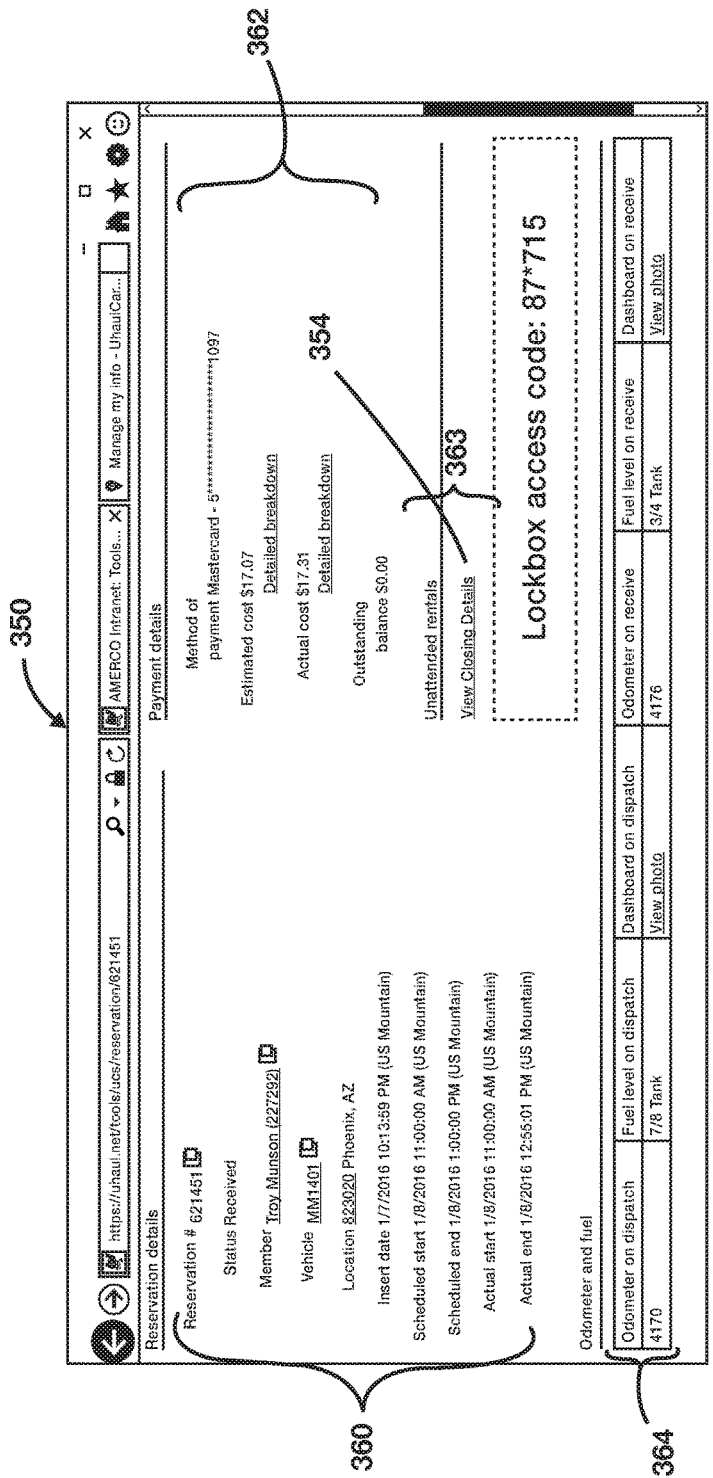
FIG. 34A shows an exemplary web page displayed on a computer screen for an administrator to view reservation information stored by the system, which includes a link to information submitted by a customer during the self-return process according to the present invention.

FIG. 34A shows an exemplary administrative computer screen display 350 for viewing reservation information stored by the system. The display 350 includes a Reservation Details section 360, a Payment Details section 362, an Unattended Rentals section 363 and an Odometer and Fuel section 364. The Unattended Rentals section 363 includes a View Closing Details link 354, which allows an administrator to view information regarding unattended returns, i.e., where the return of a rented vehicle is a self-return without requiring the physical presence of rental personnel at the return site. When the administrator selects this link, the system presents a Closing Details screen display, as shown in FIG. 34B, which displays the information submitted by a customer during the self-return process, including Customer Location details 366, Dashboard Photo information 356, Odometer and Fuel Gauge information 368 and the customer's Survey Answers 358. The Customer Location details 366 include the vehicle's "home" location (i.e., the stored location associated with the rental to indicate where the rental vehicle was supposed to be returned) with the location of the customer's mobile device when the vehicle was returned. The system compares these two locations and calculates the distance between the two locations to determine whether the customer has returned the vehicle to the correct location.

Upon reading this disclosure, those skilled in the art will appreciate that various changes and modifications may be made to the preferred embodiments of the invention and that such changes and modifications may be made without departing from the spirit of the invention. Therefore, the invention in its broader aspects is not limited to the specific details, representative devices, and illustrative examples shown and described. Accordingly, departures may be made from such details without departing from the spirit or scope of the general inventive concept.

What is claimed is:

1. A computer-implemented method for online rental of vehicles, the method comprising:

storing in a non-transitory computer database rental transaction information associated with a customer for making a reservation of a rental vehicle for a scheduled rental time period, wherein the computer database is accessible by a rental management computer system and wherein the stored rental transaction information includes a rental return location;

after the reservation of the rental vehicle has been activated:

with the rental management computer system, automatically causing a mobile computer device to display one or more mileage and fuel level interface elements to enable the customer to input via the mobile computer device information about the mileage and fuel level of the rental vehicle at the beginning of the rental, including causing the mobile computer device to (i) prompt the customer to use the mobile computer device to manually input mileage information and fuel level information for the rental vehicle, and (ii) prompt the customer to use the mobile computer device to capture image information and to send the image information to the rental management computer system;

with the rental management computer system, (i) automatically causing the mobile computer device to display an existing damage interface element to report existing damage to the rental vehicle and (ii) automatically calculating a time deadline for reporting existing damage based on a predefined time limit after the beginning of the rental to report existing damage to the rental management computer system;

with the rental management computer system, automatically causing the mobile computer device to enable the customer to send a vehicle damage report to the rental management computer system via the mobile computer device; and with the rental management system, receiving the vehicle damage report and automatically categorizing the reported damage as existing damage or new damage based on the time of receiving the damage report and the calculated time deadline for reporting existing damage;

with the rental management computer system, automatically (i) causing the mobile computer device to display to the customer a user interface element to begin a process for returning the rental vehicle, (ii) in response to the selection of the user interface element on the mobile computer device, causing the mobile computer device to share the mobile computer device GPS location information with the rental management computer system, and (iii) using the shared mobile computer device GPS location information to automatically confirm that the customer is at the rental return location;

with the rental management computer system, automatically accessing the GPS information from the mobile computer device to determine the location of the rental vehicle; and automatically comparing the GPS location information from the mobile computer device with the rental return location information and calculating the distance between the GPS location and the rental return location to determine whether to instruct the customer to move the vehicle.

2. The method for online rental of vehicles of claim 1, further comprising:

after the reservation of the rental vehicle has been activated:

with the rental management computer system, prompting the customer to use the mobile computer device to manually input mileage information and fuel level information for the rental vehicle being returned;

with the rental management computer system, prompting the customer to use the mobile computer device to capture vehicle return image information for confirming the accuracy of the mileage information and fuel level information for the rental vehicle being returned and to send the vehicle return image information to the rental computer system, wherein the vehicle return mage information includes an image of the mileage and fuel level displays of the rental vehicle and time and date information associated with the image;

with the rental management computer system, prompting the customer to use the mobile computer device to send the vehicle return image information to the rental management computer system;

with the rental management computer system, prompting the customer to use the mobile computer device to send to the rental management computer system information regarding any damage to the rental vehicle incurred since the beginning of the rental time period.

3. The method for online rental of vehicles of claim 1, further comprising:

during the rental time period, prompting the customer to use the mobile computer device to select a requested extended end time for the rental time period and to send the requested extended end time to the rental management computer system;

with the rental management computer system, automatically determining whether the requested extended end time conflicts with a future reservation for the vehicle, including automatically calculating whether the requested end time precedes the beginning of the future reservation for the vehicle by at least a preset time interval to be maintained between consecutive reservations for the vehicle; and if the requested extended end time does not conflict with a future reservation, automatically extending the rental time period to the requested extended end time.

4. A system for online rental of vehicles, the system comprising:

a database operative to store information associated with a customer for a reservation of a rental vehicle;

an input component operative to receive information from a mobile computer device used by the customer, including image information and GPS information; and a processor operative with the database to, at or during the beginning of a rental time period:

automatically cause the mobile computer device to display to the customer one or more mileage and fuel level interface elements, to enable the customer to input via the mobile computer device information about the mileage and fuel level of the rental vehicle at the beginning of the rental period;

automatically cause the mobile computer device to display an existing damage element to enable the customer to report via the mobile computer device existing damage to the rental vehicle;

automatically calculate a time deadline for reporting the existing damage to the rental vehicle based on a predefined time period after the beginning of the rental time period;

automatically cause the mobile computer device to enable the customer to a vehicle damage report to the rental computer system via the mobile computer device; and after receiving the vehicle damage report, automatically categorize the reported damage as existing damage or new damage based on the time of receiving the damage report and the calculated time deadline for reporting existing damage;

wherein the processor is further operative with the database to:

after the reservation of the rental vehicle has been activated (i) automatically cause the mobile computer device to display to the customer a user interface element to begin a process for returning the rental vehicle, (ii) in response to the selection of the user interface element on the mobile computer device, cause the mobile computer device to share the mobile computer device GPS location information with the rental management computer system, and (iii) use the shared mobile computer device GPS location information to automatically confirm that the customer is at the rental return location; and automatically compare the GPS location information from the mobile computer device with the rental return location information and calculate the distance between the GPS location and the rental return location to determine whether to instruct the customer to move the vehicle.

5. The system for online rental of vehicles of claim 4 wherein the processor is further operative with the database to, after the reservation of the rental vehicle has been activated:

prompt the customer to use the mobile computer device to manually input mileage information and fuel level information for the rental vehicle being returned;

prompt the customer to use the mobile computer device to capture vehicle return image information image for confirming the accuracy of the mileage information and fuel level information for the rental vehicle being returned and to send the vehicle return image information to the rental computer system, wherein the vehicle return image information includes an image of the mileage and fuel level displays of the rental vehicle, a time and date information associated with the image and a GPS location associated with the image;

prompt the customer to use the mobile computer device to send the vehicle return image information to the rental management computer system;

prompt the customer to use the mobile computer device to send to the rental management computer system information regarding any damage to the rental vehicle incurred since the beginning of the rental time period; and prompt the customer to use the mobile computer device to send to the rental management computer system information to determine whether the customer experienced one or more problems with the rental vehicle; and display the vehicle return image information for comparison with the manually input information about the mileage and fuel level of the rental vehicle being returned.

6. The system for online rental of vehicles of claim 4, wherein the processor is further operative with the database to:

during the rental time period, prompt the customer to use the mobile computer device to select a requested extended end time for the rental time period and to send the requested extended end time to the rental management computer system;

with the rental management computer system, automatically determine whether the requested extended end time conflicts with a future reservation for the vehicle including automatically calculating whether the requested end time precedes the beginning of the future reservation for the vehicle by at least a preset time interval to be maintained between consecutive reservations for the vehicle; and if the requested extended end time does not conflict with a future reservation, extend the rental time period to the requested extended end time.

7. The method for online rental of vehicles of claim 1, further comprising, after approval of the rental transaction, with the rental management computer system automatically generating an electronic access code associated with the rental transaction for accessing the rental vehicle and automatically sending the access code to the mobile computer device and to a device for accessing the rental vehicle.

8. The system for online rental of vehicles of claim 4, wherein the processor is further operative with the database to, after approval of the rental transaction automatically generate an electronic access code associated with the rental transaction for accessing the rental vehicle and automatically send the access code to the mobile computer device and to a device for accessing the rental vehicle.

9. A system for online rental of vehicles, the system comprising:

a database operative to store account information associated with a customer for a rental transaction;

an input component operative to receive information from a mobile computer device used by the customer, including image information; and a processor operative with the database to:

after approval of the rental transaction, automatically generate an electronic access code associated with the rental transaction for accessing the rental vehicle and to automatically send the access code to the mobile computer device and to a device for accessing the rental vehicle;

store in the database information received from the customer via the mobile computer device about the mileage and fuel level of the rental vehicle at the beginning of a rental period of the rental transaction;

notify the customer via the mobile computer device of a time limit for reporting the existing damage to the rental vehicle and store in the database information received from the customer via the mobile computer device regarding existing damage to the rental vehicle;

store in the database information received from the customer via the mobile computer regarding mileage information and fuel level information for the rental vehicle, including mileage information and fuel level information that is manually input by the customer to the mobile computer device; and store in the database image information received from the customer via the mobile computer device, wherein the image information includes an image of the mileage and fuel level displays of the rental vehicle; and wherein the processor is further operative with the database to:

automatically cause the mobile computer device to display to the customer a user interface element to begin a process for returning the rental vehicle to a rental return location;

in response to the selection of the user interface element on the mobile computer device, cause the mobile computer device to share a GPS location of the mobile computer device with the rental management computer system; and use the shared mobile computer device GPS location to automatically confirm that the customer is at the rental return location.

10. The system for online rental of vehicles of claim 9, wherein the processor is further operative with the database to:

during the rental time period, receive from the customer via the mobile computer device a requested extended end time for the rental time period;

automatically determine whether the requested extended end time conflicts with a future reservation for the vehicle; and if the requested extended end time does not conflict with a future reservation for the vehicle, extend the rental time period to the requested extended end time.

11. The system for online rental of vehicles of claim 10, wherein the processor operative with the database to automatically determine whether the requested extended end time conflicts with a future reservation for the vehicle is operative with the database to determine that there is no conflict if the requested end time precedes the beginning of the future reservation for the vehicle by at least a pre-defined time interval to be maintained between customer reservations for the vehicle.

12. The system for online rental of vehicles of claim 9, wherein the information received from the customer via the mobile computer device regarding existing damage to the rental vehicle comprises an image of the existing damage to the vehicle.

* * * * *